(12) United States Patent
Henken et al.

(10) Patent No.: US 11,517,172 B2
(45) Date of Patent: *Dec. 6, 2022

(54) CLEANING SYSTEM, CLEANING DEVICES, INSTRUCTION INSERT, AND METHODS THEREFOR

(71) Applicant: Medline Industries, LP, Northfield, IL (US)

(72) Inventors: Megan Henken, Wauconda, IL (US); Steve McNabb, Kenosha, WI (US)

(73) Assignee: Medline Industries, LP, Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,583

(22) Filed: Jan. 21, 2020

(65) Prior Publication Data

US 2020/0154970 A1 May 21, 2020

Related U.S. Application Data

(63) Continuation-in-part of application No. 15/194,252, filed on Jun. 27, 2016, now Pat. No. 11,257,398, which is a continuation-in-part of application No. 14/828,272, filed on Aug. 17, 2015, now Pat. No. 11,113,993.

(51) Int. Cl.
*G09B 19/00* (2006.01)
*A47L 13/16* (2006.01)
*B08B 1/00* (2006.01)

(52) U.S. Cl.
CPC .............. *A47L 13/16* (2013.01); *G09B 19/00* (2013.01); *B08B 1/006* (2013.01)

(58) Field of Classification Search
CPC .. G09B 19/00; G09B 19/003; G09B 19/0076; G09B 19/24; A47L 13/16
USPC ................. 434/219, 382, 428, 430
See application file for complete search history.

(56) References Cited

U.S. PATENT DOCUMENTS

| 1,852,114 A | 4/1932 | Thornton |
| D96,899 S | 9/1935 | Cohen et al. |
| 3,133,376 A | 5/1964 | Orenstein |

(Continued)

FOREIGN PATENT DOCUMENTS

| CA | 2376186 | 1/2001 |
| EM | 000495379 | 5/2006 |

(Continued)

OTHER PUBLICATIONS

Bullington, Robert , "Notice of Allowance", U.S. Appl. No. 14/828,272, filed Aug. 17, 2015; dated Apr. 8, 2021.

(Continued)

*Primary Examiner* — Kurt Fernstrom
(74) *Attorney, Agent, or Firm* — Philip H. Burrus, IV

(57) ABSTRACT

One or more microfiber sheets (1701,1802,2003,2004) are joined together at a spine (1702) to define a microfiber booklet (1700). The microfiber sheets can join together at the spine by stitching. The microfiber sheets can be manufactured from microfiber textile materials. The microfiber sheets can each be selectively movable about the spine like the pages of a book. The microfiber sheets can include alphanumeric indicia or indicators and graphical illustrations depicting objects to be cleaned by each microfiber sheet.

20 Claims, 19 Drawing Sheets

(56) References Cited

U.S. PATENT DOCUMENTS

| | | | |
|---|---|---|---|
| 3,169,264 A | 2/1965 | Walker | |
| 4,193,405 A | 3/1980 | Abels | |
| 4,372,867 A | 2/1983 | Taragos | |
| D295,538 S | 5/1988 | Stajan et al. | |
| 4,802,855 A | 2/1989 | Wood | |
| 4,832,942 A | 5/1989 | Crace | |
| D319,729 S | 9/1991 | Kogutt | |
| 5,045,080 A | 9/1991 | Dyer | |
| 5,145,377 A * | 9/1992 | Tarvin | G09B 19/00 434/170 |
| D343,862 S | 2/1994 | Wyant | |
| 5,312,257 A | 5/1994 | Tarvin et al. | |
| 5,507,065 A | 4/1996 | McBide et al. | |
| 5,671,498 A | 9/1997 | Martin et al. | |
| 5,676,482 A | 10/1997 | Hawkins | |
| D392,320 S | 3/1998 | Weed | |
| 5,851,117 A * | 12/1998 | Alsheimer | G09B 19/00 434/219 |
| 5,918,341 A * | 7/1999 | Hale | B24D 15/04 15/209.1 |
| D412,890 S | 8/1999 | Nesenoff | |
| 6,061,943 A | 5/2000 | Pepys | |
| 6,074,211 A | 6/2000 | Reid | |
| D445,227 S | 7/2001 | Tintelnot | |
| 6,256,831 B1 | 7/2001 | Chen | |
| 6,325,630 B1 | 12/2001 | Grabmayr | |
| 6,390,822 B1 | 5/2002 | Murphy et al. | |
| D460,509 S | 7/2002 | Hale | |
| D465,087 S | 11/2002 | Shapiro | |
| 6,687,941 B2 | 2/2004 | Billat | |
| 6,695,519 B2 | 2/2004 | Tims | |
| 6,858,281 B2 | 2/2005 | Kim | |
| D551,406 S | 9/2007 | Caruso | |
| D552,313 S | 10/2007 | Caruso et al. | |
| 7,297,834 B1 | 11/2007 | Shapiro | |
| D561,290 S | 2/2008 | Prior et al. | |
| D565,588 S | 4/2008 | Sherry | |
| D567,285 S | 4/2008 | Hendee | |
| D581,116 S | 11/2008 | Blom | |
| D597,850 S | 8/2009 | Quick et al. | |
| D618,410 S | 6/2010 | Libman | |
| D622,921 S | 8/2010 | Rosenzweig | |
| D627,117 S | 11/2010 | Hale | |
| D633,673 S | 3/2011 | McKnight | |
| D650,539 S | 12/2011 | Caprarola | |
| 8,077,555 B1 * | 12/2011 | Lovato | A47L 13/16 368/327 |
| D657,927 S | 4/2012 | Adams | |
| D658,188 S | 4/2012 | Diebel et al. | |
| D674,565 S | 1/2013 | Koenig et al. | |
| D681,117 S | 4/2013 | Tetrault | |
| D681,730 S | 5/2013 | Bindra | |
| D685,552 S | 7/2013 | Myers | |
| 8,800,094 B1 * | 8/2014 | Robinson | C11D 17/049 15/209.1 |
| D714,865 S | 10/2014 | Jon | |
| 8,919,349 B1 | 12/2014 | Wallace et al. | |
| 9,089,885 B2 | 7/2015 | Taylor et al. | |
| D736,314 S | 8/2015 | Urdarevik | |
| D791,231 S | 7/2017 | Wilhelm | |
| 9,839,712 B2 | 12/2017 | Bommarito | |
| D807,605 S | 1/2018 | Kim | |
| 9,940,850 B1 | 4/2018 | Oliva | |
| 10,065,447 B2 | 9/2018 | Paik et al. | |
| D833,096 S | 11/2018 | Breheny et al. | |
| D858,018 S | 8/2019 | Blom | |
| 10,660,726 B2 | 5/2020 | Blair | |
| 10,792,197 B2 | 10/2020 | Chen | |
| D906,612 S | 12/2020 | Pellegrino | |
| 10,990,777 B1 * | 4/2021 | Schenk | G06K 7/1413 |
| 11,113,993 B2 | 9/2021 | Henken | |
| D934,588 S | 11/2021 | Aldridge et al. | |
| 11,257,398 B2 | 2/2022 | Henken | |
| 2003/0121117 A1 | 7/2003 | Isenberg | |
| 2003/0233717 A1 | 12/2003 | Ortega et al. | |
| 2005/0049563 A1 | 3/2005 | Fabian | |
| 2006/0084934 A1 | 4/2006 | Milton | |
| 2006/0110719 A1 | 5/2006 | DeLack Hultin et al. | |
| 2006/0121423 A1 | 6/2006 | Hutchison | |
| 2006/0223731 A1 | 10/2006 | Carling et al. | |
| 2006/0282051 A1 | 12/2006 | Reichheld | |
| 2007/0256261 A1 | 11/2007 | Benitez et al. | |
| 2008/0051746 A1 | 2/2008 | Shen-gunther | |
| 2008/0128492 A1 | 12/2008 | Roth | |
| 2009/0248499 A1 | 10/2009 | Carling | |
| 2010/0133125 A1 | 6/2010 | Weinberger | |
| 2011/0041276 A1 | 2/2011 | Edwards et al. | |
| 2011/0114734 A1 | 5/2011 | Tiedmann et al. | |
| 2012/0301865 A1 | 11/2012 | Taylor | |
| 2012/0325710 A1 | 12/2012 | Woulms et al. | |
| 2013/0097792 A1 | 4/2013 | DeFrancesco | |
| 2013/0125307 A1 * | 5/2013 | Margalit | A47K 10/02 5/417 |
| 2013/0269137 A1 * | 10/2013 | Tekulve | C08J 9/36 15/244.4 |
| 2014/0020710 A1 * | 1/2014 | Williams | A47L 13/16 134/6 |
| 2015/0059804 A1 | 3/2015 | Bergez | |
| 2015/0074930 A1 | 3/2015 | Lebwohl et al. | |
| 2015/0140532 A1 | 5/2015 | Whitney | |
| 2017/0053549 A1 | 2/2017 | Henken | |
| 2017/0053565 A1 | 2/2017 | Henken | |
| 2017/0124917 A1 | 5/2017 | Henken | |
| 2017/0320106 A1 | 11/2017 | Hirsch et al. | |
| 2017/0340410 A1 * | 11/2017 | Maalouf | A47L 13/16 |
| 2018/0286215 A1 | 10/2018 | Christensen | |
| 2020/0154970 A1 | 5/2020 | Henken et al. | |
| 2020/0170450 A1 | 6/2020 | Goldson et al. | |
| 2020/0323414 A1 | 10/2020 | Davies | |

FOREIGN PATENT DOCUMENTS

| | | |
|---|---|---|
| EP | 000495379 | 5/2006 |
| FR | 2879913 | 6/2006 |
| WO | 2008002169 | 1/2008 |
| WO | 2011016023 | 2/2011 |

OTHER PUBLICATIONS

Bullington, Robert, "Appeal Decision", U.S. Appl. No. 14/828,272, filed Aug. 17, 2015; dated Mar. 30, 2021.

Fernstrom, Kurt, "Appeal Decision", U.S. Appl. No. 15/194,252, filed Jun. 27, 2016; dated Mar. 30, 2021.

Bullington, Robert, "NonFinal OA", U.S. Appl. No. 14/828,272, filed Aug. 17, 2015; dated Feb. 26, 2019.

Bullington, Robert, "NonFinal Office Action", U.S. Appl. No. 14/828,272, filed Aug. 17, 2015; dated Aug. 28, 2019.

Bullington, Robert P., "Final Office Action", U.S. Appl. No. 14/828,272, filed Aug. 17, 2015; dated Sep. 20, 2018.

Bullington, Robert P., "NonFinal OA", U.S. Appl. No. 14/828,272, filed Aug. 17, 2015; dated Mar. 19, 2018.

Fernstrom, Kurt, "Final OA", U.S. Appl. No. 15/194,252, filed Jun. 27, 2016; dated May 6, 2019.

Fernstrom, Kurt, "NonFinal OA", U.S. Appl. No. 15/194,252, filed Jun. 27, 2016; dated Nov. 19, 2018.

Fernstrom, Kurt, "NonFinal Office Action", U.S. Appl. No. 15/194,252, filed Jun. 27, 2016; dated Jun. 7, 2018.

Fletcher, Jerry-Daryl, "Final Office Action", U.S. Appl. No. 15/407,042, filed Jan. 16, 2017; dated Jul. 3, 2019.

Fletcher, Jerry-Daryl, "NonFinal Office Action", U.S. Appl. No. 15/407,042, filed Jan. 16, 2017; dated Dec. 16, 2019.

Fletcher, Jerry-Daryl, "Non-Final Office Action", U.S. Appl. No. 15/407,042, filed Jan. 16, 2017; dated Mar. 21, 2019.

"Deposit Photos", Link: https://www.depositphotos.com/similar-vectors/216637402.html?qview-171698504; Visited Feb. 23, 2021; Hospital operating room with people. (Year: 2021).

"Shutterstock", Link: https://www.shutterstock.com/image-vector/isometric-flat-interior-hospital-room-3d-482477011; Visited Feb. 23, 2021; Isometric flat interior of hospital room. Flat 3D illustration. (Year: 2021).

(56) References Cited

OTHER PUBLICATIONS

"Vectorsotck", Link: https://www.vectorstock.com/royalty-free-vector/isometric-low-poly-operating-room-vector-13215604; Visited Feb. 23, 2021; Isometric low poly operating room vector image. (Year: 2021).
"Vectorstock", Link: https://www.vectorstock.com/royalty-free-vector/isometric-cozy-hospital-room-vector-33301858; Visited Feb. 23, 2021; Isometric cozy hospital room vector image. (Year: 2021).
"Vectorstock", Link: https://www.vectorstock.com/royalty-free-vector/operating-room-isometric-interior-vector-35794611; Visited Feb. 23, 2021; Isometric cozy hospital room vector image. (Year: 2021).
Mcvey, Lauren , "Notice of Allowance", U.S. Appl. No. 29/721,529, filed Jan. 21, 2020; dated Mar. 5, 2021.
"Non-Final Office Action", U.S. Appl. No. 29/721,534, filed Jan. 21, 2020; dated Sep. 3, 2021.
Multipurpose Cleaning Cloths; Amazon reviews 2019, sit visited by Examiner in U.S. Appl. No. 29/721,531 on Aug. 27, 2021; https://www.amazon.com/microfiber-cleaning-different-multipurpose-kitchen/dp/B07J4CJ1R#customerReviews.
"Non-Final Office Action", U.S. Appl. No. 29/721,531, filed Jan. 21, 2020; dated Sep. 2, 2021.
"Appeal Decision", U.S. Appl. No. 15/407,042, filed Jan. 16, 2017; dated Aug. 17, 2021.
"Amazon", E-Cloth Glass & Polishing Microfiber Cleaning Clot, 300 Wash Guarantee, Reusable, Raspberry Pink, 4 Pack. https://www.amazon.com/Cloth-Glass-Polishing-Cloth-Brilliant/dp/B07G91YJB?th=1 Sep. 3, 2018.
Mcvey, Lauren, "Non-Final Office Action," U.S. Appl. No. 29/721,537, filed Jan. 21, 2020; dated Nov. 23, 2021.
Yeh, John , "NonFinal Office Action", U.S. Appl. No. 29/721,531, filed Jan. 21, 2020; dated Sep. 1, 2021.
Yeh, John R. , "NonFinal Office Action", U.S. Appl. No. 29/721,534, filed Jan. 21, 2020; dated Sep. 3, 2021.
Yeh, John , "Final Office Action", U.S. Appl. No. 29/721,531, filed Jan. 21, 2020; dated Jan. 13, 2022.
Yeh, John , "Final Office Action", U.S. Appl. No. 29/721,534, filed Jan. 21, 2020; dated Jan. 12, 2022.
"Numbers Dishcloth", Dais and Storm website comments 2020; Site visited Aug. 4, 2022 by Examiner in U.S. Appl. No. 29/721,531; available online at https://daisyandstorm.com/2020/01/12/free-numbers-dishcloth-or-afghan-squares/.
Yeh, John, "NonFinal OA", U.S. Appl. No. 29/721,534; filed Jan. 21, 2020; dated May 24, 2022.

* cited by examiner

CLEANING SYSTEM, CLEANING DEVICES, INSTRUCTION INSERT, AND METHODS THEREFOR

CROSS REFERENCE TO PRIOR APPLICATIONS

This application is a continuation-in-part application claiming priority and benefit under 35 USC § 120 from U.S. application Ser. No. 15/194,252, filed Jun. 27, 2016, which is a continuation-in-part of U.S. application Ser. No. 14/828,272, filed Aug. 17, 2015, each which is incorporated by reference for all purposes.

BACKGROUND

Technical Field

This disclosure relates generally to cleaning systems, and more particularly to cleaning systems in accordance with predefined methods.

Background Art

Cleaning articles are frequently procured as generic, commodity components. For example, cleaning cloths may be purchased in a roll, with the technique, application, and usage of each sheet left entirely up to the end user. If the user has not been properly trained to use a particular cleaning article, they may in fact cause more contamination than they reduce. It is known, for instance, that cleaning towels and cloths accumulate numerous germs and bacteria during the cleaning process. When used inappropriately, especially within a healthcare setting, some cleaning products can actually increase the chance for transmitting infection. This problem is compounded when a user is attempting to clean rooms quickly, as they frequently fail to adequately clean contact surfaces. Moreover, even when cleaning slowly people often fail to adequately clean surfaces for a variety of reasons. These reasons include accidents, the fact that the person cleaning did not know the surface was to be cleaned, and so forth.

It would be advantageous to have an improved cleaning system teaching aid, and methods for cleaning articles, especially for use in health care applications.

Figure 1:
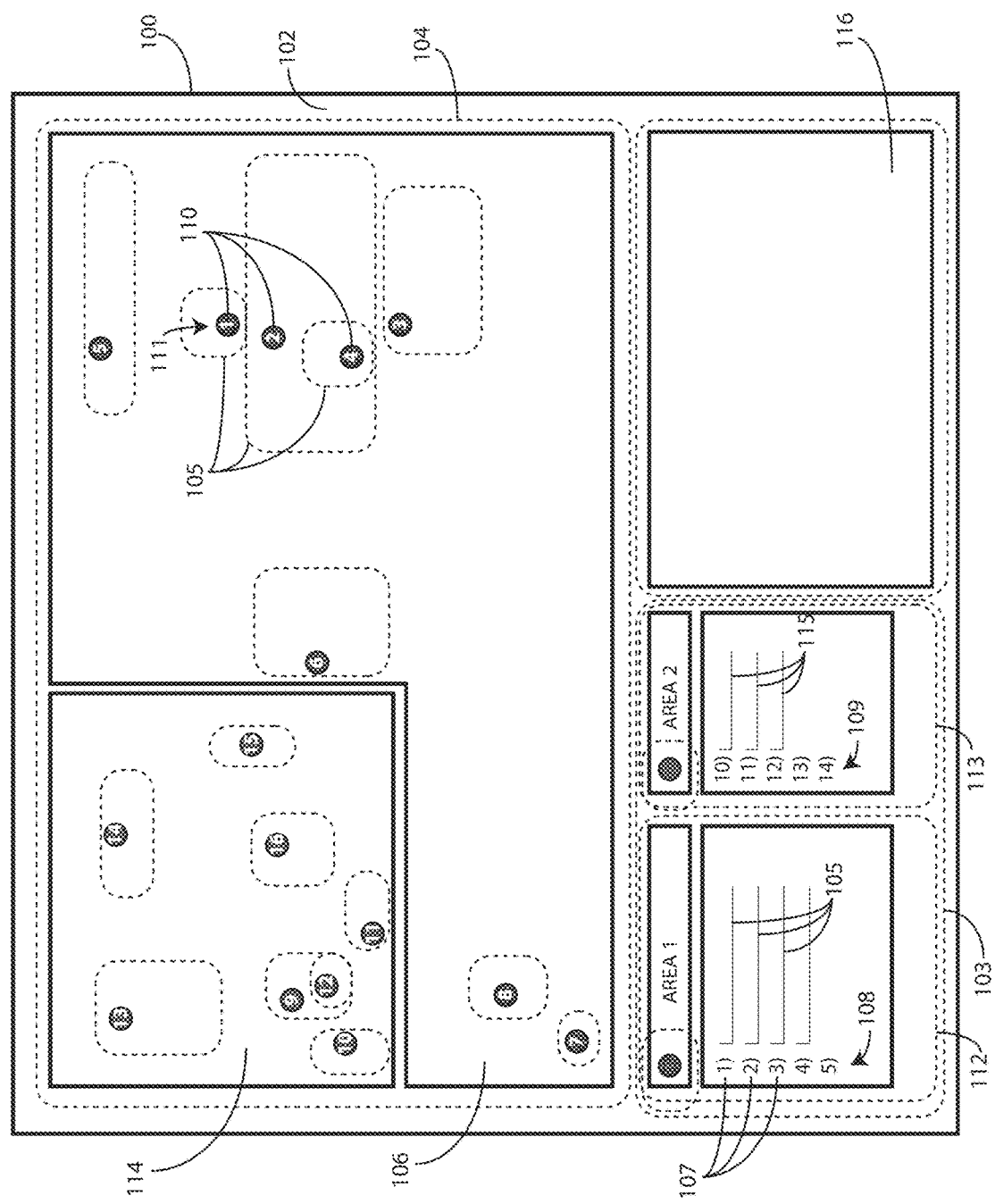
FIG. 1 illustrates one explanatory embodiment of a teaching aid in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion.

For example, talking about a device (10) while discussing figure A would refer to an element, 10, shown in figure other than figure A.

Embodiments of the disclosure provide methods and devices to assist in the training of medical personnel. Embodiments of the disclosure assist health care personnel in understanding how to clean a predefined area, such as a patient's room, in what particular order the portions of the area should be cleaned, and how to use cleaning articles included with a cleaning package assembly to provide a systematic approach that reduces the chance that a patient will acquire an infection.

In one embodiment, a teaching device that can be configured as a teaching aid or teaching insert in a cleaning package assembly that describes an order in which items in a predefined area, such as a hospital room, operating room, or other room, should be cleaned. A primary advantage offered by embodiments of the disclosure is that the teaching aid or insert, and the plurality of sequential numerical indicia defining a cleaning order for a predefined area, combined with the inclusion of depictions of objects to be cleaned with each microfiber sheet, which are, to be sure, functionally related to the microfiber sheets upon which they are placed, and which are included with the cleaning package assembly, or alternatively microfiber booklets that include numerical indicia indicating a predefined order combined with graphical illustrations identifying objects to be cleaned in accordance with that predefined order, encourages a person cleaning to identify the appropriate areas to be cleaned, thereby ensuring they will not be missed. Embodiments of the disclosure also encourage the person cleaning to clean those surfaces in the most efficient and sanitary way and/or order.

In one embodiment, a teaching aid includes a legend portion and a predefined area portion. The teaching aid is to assist teaching a cleaning order for a predefined area, such as a patient's hospital room or an operating room. The legend portion can define a plurality of portions of the predefined area, while the predefined portion area pictorially illustrates the plurality of portions.

In one embodiment where the predefined area to be cleaned is a patient's room, the legend portion can include one or more matrices that list, in a 1×N matrix, restroom portions and patient room portions to be cleaned. In another embodiment where the predefined area comprises an operating room, the legend portion can include one or more matrices that list, in a 1×N matrix, functional portions of the predefined area to be cleaned, such as the bed surface functional area, the anesthesia functional area, and surfaces between these functional areas. Other configurations for the legend portion will be obvious to those of ordinary skill in the art having the benefit of this disclosure.

In one or more embodiments, these one or more matrices can be listed side-by-side, atop each other, or in other geometric relationships. In one embodiment, these matrices include a restroom matrix and an additional room matrix. In one embodiment, the additional room is a patient's portion of a hospital room that is exterior to the restroom. In another embodiment, these matrices cam include a bed surfaces matrix and an anesthesia matrix for an operating room.

In one or more embodiments, where the microfiber booklets include not only numerical indicia indicating a predefined order, but also include graphical illustrations identifying objects to be cleaned in accordance with that predefined order, rear sides of the teaching aids can include a matrix of these graphical illustrations with language translations shown therewith, thereby allowing speakers of a plurality of languages to easily determine what each graphical illustration identifies. For example, a graphical illustration of a chair may be placed on the reverse side of the teaching aid with the word "chair" for English speakers, "fauteuil" for French speakers, "silla" for Spanish speakers, "stuhl" for German speakers, "poltrona" for Italian speakers, "stol" for Swedish speakers, "zidle" for Czech speakers, Chinese characters for Chinese speakers, "krzesto" for Polish speakers, Japanese characters for Japanese speakers, "kpecno" for Russian speakers, "stol" for Slovenian speakers, "scaun" for Romanian speakers, and so forth.

In one or more embodiments, the items presented in each matrix are associated with a plurality of sequential numerical and/or alphanumeric indicia. Said differently, in one embodiment the legend portion can define a plurality of sequential numerical indicia defining a predefined order in which the plurality of portions of a predefined area should be cleaned. In one embodiment, the restroom matrix includes a first subset of the plurality of sequential numerical indicia, while the additional room matrix includes a second subset of the plurality of sequential numerical indicia.

In one embodiment, the first subset and the second subset can be non-overlapping. Illustrating by example, in one embodiment the legend portion describes sixteen contact points within a hospital room, with eight set forth in the restroom matrix and eight set forth in the additional room matrix. These contact points can be numbered sequentially. Thus, the eight contact points within the hospital room may be numbered one through eight, while the eight contact points within the restroom matrix can be numbered nine through sixteen.

However, in other embodiments, the first subset and the second subset can be overlapping with other distinguishing features that indicate which subset applies to which area. For example, in one embodiment the legend portion describes fourteen contact points within a hospital room with eight set forth in the restroom matrix and eight set forth in the additional room matrix. These contact points can be numbered sequentially, but with common numbers set forth in each subset. Thus, the seven contact points within the hospital room may be numbered one through seven. Similarly, the seven contact points within the restroom matrix can be numbered one through seven.

However, so that the person employing the system, the contact points within the hospital room may be color-coded differently from those in the restroom. The contact points in the hospital room may be blue while the contact points in the restroom are green, and so forth. Accordingly, when a user is cleaning with sheets of a microfiber booklet, or alternatively with cleaning sheets, those materials can be color-coded so as to correspond with the color-coding of the numerical indicia. Accordingly, the user is provided with a mnemonic device with which they may instantly identify which cleaning article is to be used with which room.

In one embodiment, the additional room matrix can define additional room portions each associated with one of the plurality of sequential indicia on a one-to-one basis. Explanatory additional room portions of one illustrative embodiment include: bed rails; a nurse call device; a patient table; a remote control; a table; a television; a light switch; and doorknobs. Explanatory additional room portions of another illustrative embodiment include: a light switch and room inner door knob; a call box button and telephone; bedside rails and controls on remote control devices; bedside table handles; a tray table; a chair; and a room sink. Other additional room portions will be obvious to those of ordinary skill in the art having the benefit of this disclosure.

In one embodiment the restroom portions arranged in a predefined order, with each portion corresponding to the numbers one through eight, inclusive. In another embodiment, the restroom portions arranged in another predefined order, with each portion corresponding to the numbers one through seven, inclusive.

Similarly, the restroom matrix can define restroom portions each associated with one of the plurality of sequential indicia on a one-to-one basis. Explanatory restroom portions of one embodiment include: a toilet seat; hand rails; restroom walls; a toilet bowl; a storage area; a shower; a sink; and doorknobs. Explanatory restroom portions of another embodiment include: a bathroom inner door knob; a bathroom light switch; a bathroom sink; bathroom handrails by toilet; a toilet bedpan cleaner; a toilet flush handle; and a toilet seat. Other restroom portions will be obvious to those of ordinary skill in the art having the benefit of this disclosure.

In other embodiments, substeps will be used. For example, when cleaning an operating room, the lights might be labeled "1", while the monitor might be numbered "2." The arms of the table, bed controls, and body straps might be labeled "3." The mattress might be labeled with substeps, such as one side being labeled "4A," while the other is labeled "4B." Similarly, the table might be labeled "5A" and "5B." Other numbering configurations will be obvious to those of ordinary skill in the art having the benefit of this disclosure.

Where the predefined area is a patient's room, in one embodiment the restroom portions arranged in one predefined order, with each portion corresponding to the numbers nine through sixteen, inclusive. In another embodiment the restroom portions arranged in another predefined order, with each portion corresponding to the numbers one through seven, inclusive.

In one embodiment, the predefined area portion includes a plurality of visual indicators assigned to the plurality of portions of the predefined area on a one-to-one basis, with each visual indicator comprising one of the plurality of sequential numerical indicia. For example, in one embodiment each of the plurality of visual indicators comprises a circle with a number superimposed on the circle. In another embodiment, each of the plurality of sequential numerical indicia comprises a square with a number superimposed on the circle.

In one or more embodiments, both the plurality of sequential numerical indicia and the plurality of visual indicators are color-coded. For example, in one embodiment the sequential numerical indicia corresponding to the predefined area portions of the restroom are color-coded green, as are the visual indicators that are to be placed in the restroom. Similarly, in one embodiment the sequential numerical indicia corresponding to the predefined area portions of the additional room are color-coded blue, as are the visual indicators that are to be placed in the additional room. In one or more embodiments, cleaning cloths or microfiber booklets can be color-coded to indicate which cleaning cloth, or alternatively which microfiber booklet, should be used to clean items upon which the commonly color-coded visual indicators are placed.

Accordingly, if the television of the patient's room is set forth as number six in the additional room matrix, the predefined area portion may include a pictorial illustration of the television with a circle with the number "6" illustrated graphically on the pictorial representation of the television. The other items of the predefined area can be similarly represented in the predefined area portion.

In one embodiment, sixteen contact points in a hospital room are numbered on the teaching aid in the order in which they should be cleaned. In another embodiment, fourteen contact points in a hospital room are numbered on the teaching aid in the order in which they should be cleaned. Other numbers of contact points will be obvious to those of ordinary skill in the art having the benefit of this disclosure. In either embodiment, personnel can begin with the number "1" and follow the numbers in order to ensure that all fourteen, sixteen, or other number of cleaning locations are cleaned in a predefined order.

In one or more embodiments, these numbers are arranged in a manner that increases efficiency by putting them in an order that logically follows a predefined flow throughout the room to ensure that all personnel clean in the same manner and same order to create a systematic approach that ensures compliance with hygiene standards. Supervisory personnel can follow-up with weekly spot checks or adenosine triphosphate meters to verify that each of the various contact points is being cleaned.

It should be noted that while a hospital room or operating room is used herein as an explanatory predefined area, embodiments of the disclosure are not so limited. The teaching aid, cleaning articles, and cleaning package assemblies of embodiments of the disclosure can also be used to clean hotel rooms, dormitory rooms, motel rooms, and other rooms as well. Still other predefined areas will be obvious to those of ordinary skill in the art having the benefit of this disclosure. The visual teaching aids and methods described below can be applied to a wide variety of predefined areas where various portions are to be cleaned sequentially.

Embodiments of the disclosure provide a teaching aid that simplifies the understanding of proper cleaning techniques. Identifying the proper order of cleaning a predefined area, as well as the proper way to use corresponding cleaning articles, is frequently confusing to cleaning personnel. However, the use of teaching aids configured in accordance with embodiments of the disclosure offers a teaching tool that is easily understandable by many types of learners. Accordingly, the use of teaching aids configured in accordance with embodiments of the disclosure results in rooms being more efficiently and accurately cleaned. This is important because the consequences of improper cleaning can result in an increased infection transmission rate.

Turning now to FIG. 1, illustrated therein is one embodiment of a visual teaching aid 100 configured in accordance with one or more embodiments of the disclosure. The visual teaching aid 100 is to assist in teaching a cleaning order for a predefined area, such as a patient's room in a hospital. In this embodiment, the visual teaching aid 100 of FIG. 1 is disposed along a substantially flat substrate 102, such as a piece of paper, poster board, cardboard, card stock, film, laminate, plastic sheeting, or other substantially flat substrate upon which printing can be disposed. In one or more embodiments where the substantially flat substrate 102 is paper-based, the visual teaching aid 100 can be laminated as well.

While the substantially flat substrate 102 is singular in the embodiment of FIG. 1, with all information disposed along a single major face of the substantially flat substrate 102, the visual teaching aid 100 could be configured in other ways as well. For example, the visual teaching aid 100 could be configured as a stack of cards, a stack of flash cards, a bi-fold, tri-fold, or multi-fold pamphlet, scroll, or booklet. Additionally, the substantially flat substrate 102 could be a garment, such as a t-shirt or other garment. In one embodiment, the substantially flat substrate 102 is configured as a folio or cover for a tablet computer or palm-top computer. The substantially flat substrate 102 could also be configured as a case for a laptop computer or a medical journal. Still other examples of substantially flat substrates will be obvious to those of ordinary skill in the art having the benefit of this disclosure. For example, as will be shown in FIG. 23 below, the visual teaching aid 100 could be configured for presentation on a tablet or other type of computer as well.

In one embodiment, the visual teaching aid 100 comprises a legend portion 103 and a predefined area portion 104. The legend portion 103 can define a plurality of portions 105 of the predefined area 106, while the predefined area portion 104 pictorially illustrates the plurality of portions 105. Illustrating by example, where the predefined area 106 is a patient's hospital room, the plurality of portions 105 may include bed rails, a nurse call device, a patient table, a remote control, a table, a television, a light switch, and doorknobs, with each of these being pictorially shown in the predefined area portion 104. These can be listed as text in the legend portion 103. They can then be pictorially illustrated in the predefined area portion 104 as shown in FIG. 1.

In one embodiment, the legend portion 103 further defines a plurality of sequential numerical indicia 107. In one embodiment, the plurality of sequential numerical indicia 107 indicates a predefined order in which the plurality of portions 105 of the predefined area 106 should be cleaned. In one embodiment, the plurality of sequential numerical indicia 107 comprises the numbers one through sixteen, inclusive. In one embodiment, the legend portion 103 can include a first subset 108 of the plurality of sequential numerical indicia 107. Similarly, the predefined area portion 104 can include a second subset 109 of the plurality of sequential numerical indicia 107.

In one embodiment, the first subset 108 and the second subset 109 are non-overlapping. For example, where the plurality of sequential numerical indicia 107 comprise the numbers one through sixteen, inclusive, the first subset 108 may include the numbers one through eight, inclusive, while the second subset 109 includes the numbers nine through sixteen, inclusive. Other non-overlapping subset subdivisions of the plurality of sequential numerical indicia 107 will be obvious to those of ordinary skill in the art having the benefit of this disclosure.

In another embodiment, the first subset 108 and the second subset 109 are sequential, but are overlapping. In such embodiments common sequences can be separated by room or other criteria. For example, where the plurality of sequential numerical indicia 107 comprise the numbers one through seven, inclusive, the first subset 108 may include the numbers one through seven, inclusive, while the second subset 109 also includes the numbers nine through seven, inclusive.

Where the first subset 108 and the second subset 109 are overlapping, other indicators can be used to identify whether the number "two," for example, is associated with a first portion of the predefined area 106 or a second portion of the predefined area 106. In one embodiment, color-coding provides the additional indicator to indicate whether particular numerical indicia correspond to a first portion of the predefined area 106 or a second portion of the predefined area 106. Other indicators suitable for distinguishing multiple usages of overlapping numerical indicia will be obvious to those of ordinary skill in the art having the benefit of this disclosure. Additionally, other overlapping subsets of the plurality of sequential numerical indicia 107 will be obvious to those of ordinary skill in the art having the benefit of this disclosure. While sixteen and fourteen subsets are used herein illustratively, other quantities can be used as well.

In one or more embodiments, the first subset 108 and the second subset 109 can be arranged in a predefined order. In one embodiment, the predefined order is an ascending order indicating in which order the plurality of portions 105 should be cleaned. For example, where the first subset 108 includes the numbers one through eight, inclusive, and the predefined order is an ascending order, a person should clean portion one prior to portion two, portion two prior to portion three, and so forth. Similarly, where the first subset 108 includes the numbers one through seven, inclusive, and the predefined order is an ascending order, a person should clean portion one prior to portion two, portion two prior to portion three, and so forth.

Thus, where the predefined area 106 is a patient's hospital room and the plurality of portions 105 may include bed rails, a nurse call device, a patient table, a remote control, a table, a television, a light switch, and doorknobs, the legend portion 103 may list these items with the plurality of sequential numerical indicia 107 in the first subset 108 as follows: 1—bed rails, 2—a nurse call device, 3—a patient table, 4—a remote control, 5—a table, 6—a television, 7—a light switch, and 8—doorknobs. In another embodiment where the predefined area 106 is a patient's hospital room and the plurality of portions 105 include a light switch, a room inner door knob, a call box button, a telephone, bedside rails, controls on remote control devices, bedside table handles, a tray table, a chair, and a room sink, some of these elements can be combined together to reduce the number of indicia appearing in the first subset 108 to a predefined limit, such as seven. Accordingly, in one embodiment the legend portion 103 may list these items with the plurality of sequential numerical indicia 107 in the first subset 108 as follows: 1—a light switch and room inner door knob, 2—a call box button and telephone, 3—bedside rails and controls on remote control devices, 4—bedside table handles, 5—a tray table, 6—a chair, and 7—a room sink.

In one or more embodiments, the legend portion 103 comprises one or more matrices. For example, in FIG. 1 the legend portion 103 comprises a first matrix 112 and a second matrix 113. The same will be true with the illustrative teaching aid of FIG. 6 below. In one embodiment, each of the first matrix 112 and the second matrix 113 comprises a 1×N matrix where N refers to the number of portions of the predefined area 106 found in that matrix. While the first matrix 112 and the second matrix 113 are shown side-by-side in the illustrative embodiment of FIG. 1, they could be arranged in other ways as well. For example, as will be shown below in FIGS. 3 and 4, in another embodiment they are arranged atop each other. Other geographic relationships between the first matrix 112 and the second matrix 113 will be obvious to those of ordinary skill in the art having the benefit of this disclosure.

In one embodiment, the first matrix 112 and the second matrix 113 refer to different rooms within the predefined area 106. For example, in one embodiment the first matrix 112 corresponds to portions of the predefined area 106 disposed outside the restroom portion 114, while the second matrix 113 corresponds to portions of the predefined area 106 disposed within the restroom portion 114.

Where the predefined area 106 is a hospital room, the first matrix 112 may correspond to the patient portion of the hospital room while the second matrix 113 corresponds to the restroom portion 114 of the hospital room. Thus, while one plurality of portions 105 of the predefined area 106 found in the first matrix 112 may be bed rails, a nurse call device, a patient table, a remote control, a table, a television, a light switch, and doorknobs, another plurality of portions 115 of the predefined area 106 found in the second matrix 113 may include a toilet seat, a toilet seat, hand rails, restroom walls, a toilet bowl, a storage area, a shower, a sink, and doorknobs. Other examples of portions will be illustrated below with reference to FIGS. 3-4. Still others will be obvious to those of ordinary skill in the art having the benefit of this disclosure. In one embodiment, the first matrix 112 and the second matrix 113 are arranged in a single column having N rows as shown in FIG. 1.

The number of portions found in each of the first matrix 112 and the second matrix 113 will vary based upon the type of predefined area 106. For example, if the predefined area 106 is a hospital room, a first number of items will be found in the first matrix 112 and second matrix 113. However, if the predefined area 106 is a hotel room, that number will change. Some predefined areas will have many portions, while others will have only a few.

In one or more embodiments, the predefined area portion 104 includes a plurality of visual indicators 110 that are assigned to the plurality of portions 105 of the predefined area 106. In one embodiment, the plurality of visual indicators 110 are assigned to the plurality of portions 105 of the predefined area 106 on a one-to-one basis such that each portion has one visual indicator. In one embodiment, each of the plurality of visual indicators 110 comprises one of the plurality of sequential numerical indicia 107. Thus, if the bed rails are number one, the visual indicator 111 assigned to the bed rails would include the number one disposed thereon. As shown in FIG. 1, in one or more embodiments each visual indicator of the plurality of visual indicators 110 comprises a circle with a number superimposed on the circle. In one or more embodiments, the circles can be color-coded as well. This will be described in more detail with reference to FIGS. 2-7.

In one or more embodiments, other indicia 116 can be presented on the visual teaching aid 100 as well. For example, in this illustrative embodiment the other indicia 116 comprise a pictorial panel in which a picture of a predefined activity can be illustrated. In one embodiment where the visual teaching aid 100 is to assist in teaching a cleaning order for the predefined area 106, the pictorial panel may comprise an image showing a proper cleaning technique to be applied to the plurality of portions 105 of the predefined area 106 listed in the first matrix 112 and second matrix 113, respectively. Other pictorial and non-pictorial information suitable for inclusion with the other indicia 116 will be obvious to those of ordinary skill in the art having the benefit of this disclosure.

Figure 2:
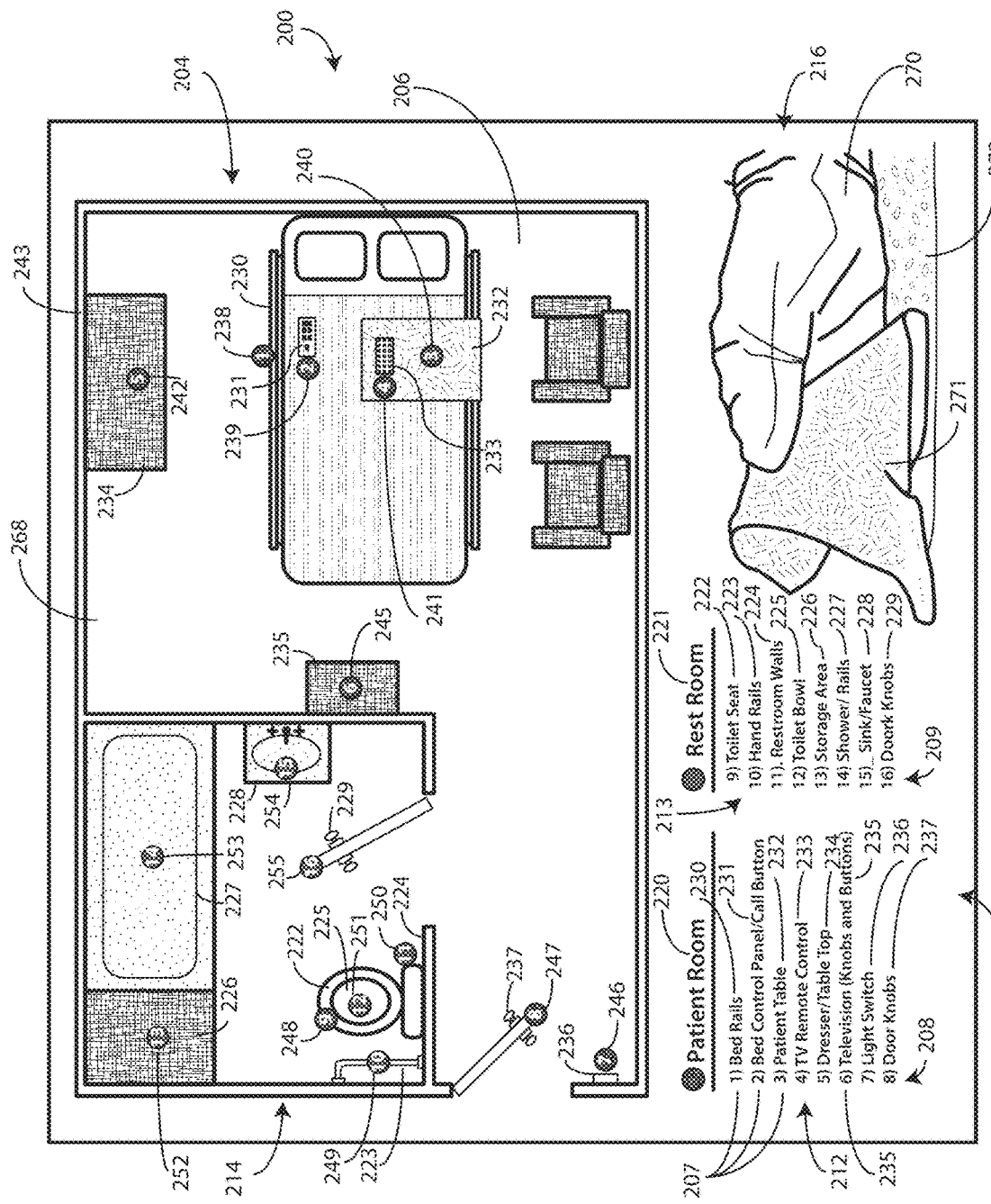
FIG. 2 illustrates another explanatory embodiment of a teaching aid in accordance with one or more embodiments of the disclosure.

Turning now to FIG. 2, illustrated therein is an explanatory teaching aid configured as a teaching insert 200 to be included with a cleaning package assembly, one of which will be shown below with reference to FIG. 21.

In the explanatory teaching insert 200 of FIG. 2, the predefined area (106) comprises a hospital room. The additional room portion 204 of this teaching insert 200 illustrated the hospital room pictorially as a floor plan 243. As noted above, other types of predefined areas can be substituted for the hospital room, including motel rooms, banquet rooms, restaurant dining rooms, locker rooms, classrooms, bathrooms, spas, sports stadiums, municipal and government buildings, and so forth.

As with the visual teaching aid (100) of FIG. 1, the teaching insert is disposed along a flat substrate and includes a legend portion 203 and an additional room portion 204. Here, the predefined area 206 is a hospital room. Accordingly, the legend portion 203 is subdivided into an additional room matrix 212 for the patient portion of the hospital room exterior to the restroom portion 214 and a restroom matrix 213 for the restroom portion 214 of the hospital room.

As with the embodiment of FIG. 1, the legend portion 203 can define a plurality of portions of the hospital room, with each being listed in the legend portion 203 and shown pictorially in the additional room portion 204. In one embodiment, the restroom matrix 213 comprises a first subset 209 of a plurality of sequential numerical indicia 207, while the additional room matrix 212 comprises a second subset 208 of the plurality of sequential numerical indicia 207. In one embodiment, the first subset 209 and the second subset 208 are non-overlapping.

As shown in FIG. 2, each of the restroom matrix 213 and the additional room matrix 212 comprise a 1×N matrix arranged in a column. A header 220,221 appears at the top of the additional room matrix 212 and the restroom matrix 213, respectively. Beneath the header 220,221 are found the first subset 209 and second subset 208 of the plurality of sequential numerical indicia 207. Here, the second subset 208 comprises the numbers one through eight, inclusive, while the first subset 209 comprises the numbers nine through sixteen, inclusive.

In one embodiment, the restroom matrix 213 further defines restroom portions that are each associated with one of the plurality of sequential numerical indicia 207 on a one-to-one basis. In this illustrative embodiment, the restroom portions comprise a toilet seat 222, handrails 223, restroom walls 224, a toilet bowl 225, a storage area 226, a shower 227, a sink 228, and doorknobs 229. Each of these items is illustrated pictorially in the additional room portion 204, and more particularly in the restroom portion 214.

In one embodiment, these restroom portions are arranged in a predefined order in accordance with the plurality of sequential numerical indicia 207. For example, in this illustrative embodiment the toilet seat 222 corresponds to the number nine, the handrails 223 correspond to the number ten, the restroom walls 224 correspond to the number eleven, the toilet bowl 225 corresponds to the number twelve, the storage area 226 corresponds to the number thirteen, the shower 227 corresponds to the number fourteen, the sink 228 corresponds to the number fifteen, and the doorknobs 229 correspond to the number sixteen. Accordingly, a person cleaning these portions would start with the portion associated with the number nine, i.e., the toilet seat 222, and then move sequentially through the portions in accordance with the plurality of sequential numerical indicia 207 to the number sixteen.

Similarly, in one embodiment the additional room matrix 212 defines additional room portions that are each associated with one of the plurality of sequential numerical indicia 107 on a one-to-one basis. In this illustrative embodiment, the additional room portions comprise bed rails 230, a nurse call device 231, a patient table 232, a remote control 233, a table 234, a television 235, a light switch 236, and doorknobs 237. Each of these items is then illustrated pictorially in the additional room portion 204, and more particularly in the patient room 268.

In one embodiment, these additional room portions are arranged in a predefined order in accordance with the plurality of sequential numerical indicia 207. For example, in this illustrative embodiment the bed rails 230 correspond to the number one, the nurse call device 231 corresponds to the number two, the patient table 232 corresponds to the number three, the remote control 233 corresponds to the number four, the table 234 corresponds to the number five, the television 235 corresponds to the number six, the light switch 236 corresponds to the number seven, and the doorknobs 237 correspond to the number eight. Accordingly, a person cleaning these portions would start with the portion associated with the number one, i.e., the bed rails 230, and then move sequentially through the portions in accordance with the plurality of sequential numerical indicia 207 to the number eight.

When cleaning the entire predefined portion, a person would clean the items in the additional room matrix 212 prior to the items in the restroom matrix 213 in this embodiment. For example, the person would start with the patient room 268, cleaning the portion associated with the number one, i.e., the bed rails 230, first. The person would then move sequentially through the portions in accordance with the plurality of sequential numerical indicia 207 to the number eight, i.e., the doorknobs 237. Next, the person would move to the restroom portion 214, cleaning the portion associated with the number nine, i.e., the toilet seat 222, initially. The person would then move sequentially through the portions in accordance with the plurality of sequential numerical indicia 207 to the number sixteen, i.e., the doorknobs 229, to complete the cleaning of the predefined area 206.

To make things easier for the person, rather than having to read the restroom matrix 213 and the additional room matrix 212, the corresponding items disposed therein, and the plurality of sequential numerical indicia 207, the additional room portion 204 can include a pictorial illustration of the hospital room with each item shown pictorially as well. A plurality of visual indicators can be assigned to the plurality of portions of the predefined area on a one-to-one basis. In this illustrative example, the bed rails 230 correspond to a first visual indicator 238, the nurse call device 231 corresponds to a second visual indicator 239, the patient table 232 corresponds to a third visual indicator 240, the remote control 233 corresponds to a fourth visual indicator 241, the table 234 corresponds to a fifth visual indicator 242, the television 235 corresponds to a sixth visual indicator 245, the light switch 236 corresponds to a seventh visual indicator 246, and the doorknobs 237 correspond to an eighth visual indicator 247. Similarly, in one embodiment the toilet seat 222 corresponds to a ninth visual indicator 248, the handrails 223 corresponds to a tenth visual indicator 249, the restroom walls 224 correspond to an eleventh visual indicator 250, the toilet bowl 225 corresponds to a twelfth visual indicator 251, the storage area 226 corresponds to a thirteenth visual indicator 252, the shower 227 corresponds to a fourteenth visual indicator 253, the sink 228 corresponds to a fifteenth visual indicator 254, and the doorknobs 229 correspond to a sixteenth visual indicator 255.

In one embodiment, each visual indicator 238,239,240, 241,242,245,256,247,248,249, 250,251,252,253,254,255, 256 is configured as a circle with a number superimposed upon the circle. For example, in one embodiment the first visual indicator 238 is a circle with the number one superimposed on the circle, while the second visual indicator 239 is a circle with the number two superimposed on the circle and so forth. In one embodiment, each visual indicator 238,239, 240,241,242,245,256,247,248,249, 250,251,252, 253,254,255,256 is color coded as well. For example, in one embodiment the visual indicators 238,239,240,241,242,245, 256,247,248 set forth in the additional room matrix 212 each comprise blue circles with white numbers disposed thereon, while the visual indicators 249, 250,251,252,253,254,255, 256 in the restroom matrix 213 each comprise red circles or green circles. This color-coding allows a person cleaning the predefined area 206 to quickly identify which portions of the predefined area 206 are to be cleaned first and which are to be cleaned second.

In this illustrative embodiment, the other indicia 216 comprises a pictorial representation of a gloved hand 271 cleaning a surface 272 with a cleaning cloth 273. As noted above, if a particular user has not been properly trained to use a particular cleaning article, they may in fact cause more contamination than they reduce. Accordingly, in one embodiment the teaching insert 200 can include a pictorial representation of a gloved hand 271 cleaning a surface 272 with a cleaning cloth 273 to provide yet even further instruction regarding proper cleaning techniques.

Figure 3:
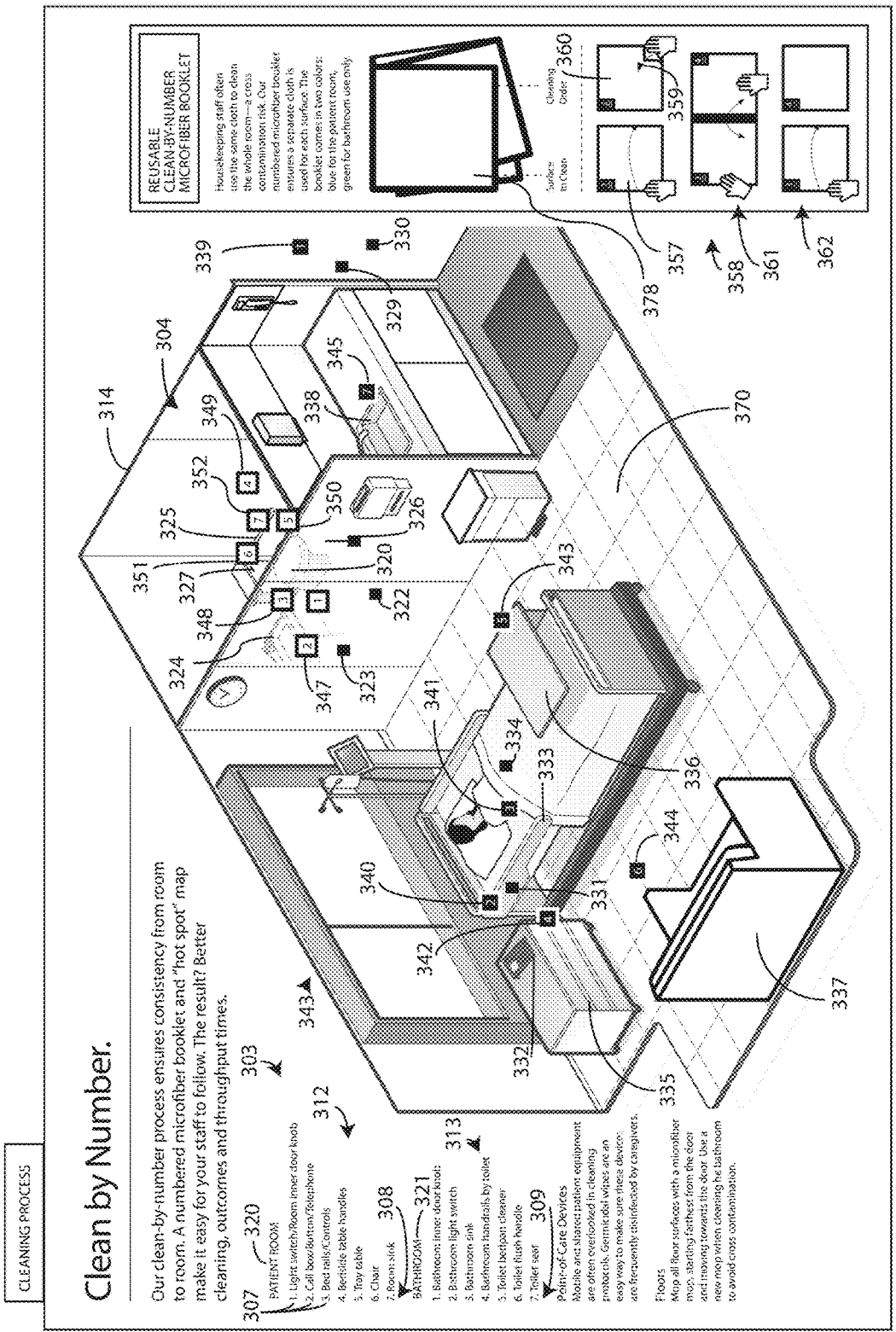
FIG. 3 illustrated yet another explanatory embodiment of a teaching aid in accordance with one or more embodiments of the disclosure.

Turning now to FIG. 3, illustrated therein is another explanatory teaching aid configured as a teaching insert 300 to be included with a cleaning package assembly, one of which will be shown below with reference to FIG. 21.

In the explanatory teaching insert 300 of FIG. 3, the predefined area (106) again comprises a hospital room. The additional room portion 304 of this teaching insert 300 illustrated the hospital room pictorially as a floor plan 370. In contrast to the floor plan (243) of FIG. 2, which was shown in a plan view, the floor plan 370 of FIG. 3 is shown in a three-dimensional isometric view. As noted above, other types of predefined areas can be substituted for the hospital room, including motel rooms, banquet rooms, restaurant dining rooms, locker rooms, classrooms, bathrooms, spas, sports stadiums, municipal and government buildings, and so forth. Additionally, while three-dimensional isometric view and plan view are two ways in which the floor plan 370 can be shown, others can be used as well. For example, in another embodiment the floor plan 370 is shown as a three-dimensional physical model. In another embodiment, the floor plan 370 is shown as a "360-degree" virtual reality video. In yet another embodiment, the floor plan 370 is shown as a hologram. Other methods for presenting and displaying the floor plan 370 will be obvious to those of ordinary skill in the art having the benefit of this disclosure.

As with the visual teaching aid (100) of FIG. 1, the teaching insert 300 includes a legend portion 303 and an additional room portion 304. Here, the predefined area 306 is a hospital room. Accordingly, the legend portion 303 is subdivided into an additional room matrix 312 for the patient portion of the hospital room exterior to the restroom portion 314 and the restroom matrix 313 for the restroom portion 314 of the hospital room. In contrast to the legend portion (203) of FIG. 2, where the additional room matrix (212) for the patient portion of the hospital room exterior to the restroom portion (214) and the restroom matrix (213) for the restroom portion (214) of the hospital room were shown side by side, here the additional room matrix 312 for the patient portion of the hospital room exterior to the restroom portion 314 and the restroom matrix 313 for the restroom portion 314 of the hospital room are placed atop each other. Other geographical relationships between the additional room matrix 312 and the restroom matrix 313 will be obvious to those of ordinary skill in the art having the benefit of this disclosure.

As with the embodiment of FIG. 1, the legend portion 303 can define a plurality of portions of the hospital room, with each being listed in the legend portion 303 and shown pictorially in the additional room portion 304. In one embodiment, the restroom matrix 313 comprises a first subset 309 of a plurality of sequential numerical indicia 307, while the additional room matrix 312 comprises a second subset 308 of the plurality of sequential numerical indicia 307. In contrast to the embodiment of FIG. 2, where the first subset (209) and the second subset (208) were non-overlapping, here the first subset 309 and the second subset 308 are overlapping, and include sequential numerical indicia 307 one through seven, inclusive.

As shown in FIG. 3, each of the restroom matrix 313 and the additional room matrix 312 comprise a 1×N matrix arranged in a column. A header 320,321 appears at the top of the additional room matrix 312 and the restroom matrix 313, respectively. Beneath the header 320,321 are found the first subset 309 and second subset 308 of the plurality of sequential numerical indicia 307. Here, the second subset 308 comprises the numbers one through seven, inclusive, while the first subset 309 also comprises the numbers one through seven, inclusive.

In one embodiment, the restroom matrix 313 further defines restroom portions that are each associated with one of the plurality of sequential numerical indicia 307 on a one-to-one basis. In this illustrative embodiment, the restroom portions comprise a bathroom inner doorknob 322, a bathroom light switch 323, a bathroom sink 324, bathroom handrails by toilet 325, a toilet bedpan cleaner 326, a toilet flush handle 327, and a toilet seat 328. Each of these items is illustrated pictorially in the additional room portion 304, and more particularly in the restroom portion 414.

In one embodiment, these restroom portions are arranged in a predefined order in accordance with the plurality of sequential numerical indicia 307. Some of the elements can be combined so as to keep the number of sequential numerical indicia 307 limited below a predefined threshold, such as seven. For example, in this illustrative embodiment the bathroom inner doorknob 322 corresponds to the number one, the bathroom light switch 323 corresponds to the number two, the bathroom sink 324 corresponds to the number three, the bathroom handrail by the toilet 325 corresponds to the number four, the toilet bedpan cleaner 326 corresponds to the number five, the toilet flush handle 327 corresponds to the number six, and the toilet seat 328 corresponds to the number seven. Accordingly, a person cleaning these portions would start with the portion associated with the number one, i.e., bathroom inner doorknob 322, and then move sequentially through the portions in accordance with the plurality of sequential numerical indicia 307 to the number seven.

Similarly, in one embodiment the additional room matrix 312 defines additional room portions that are each associated with one of the plurality of sequential numerical indicia 207 on a one-to-one basis. As before, some of the elements can be combined so as to keep the number of sequential numerical indicia 307 limited below a predefined threshold, such as seven. For example, in this illustrative embodiment the additional room portions comprise a light switch 329 and room inner doorknob 330, a call box button 331 and telephone 332, bedside rails 333 and controls 334 on remote control devices, bedside table handles 335, a tray table 336, a chair 337, and a room sink 338. Each of these items is then illustrated pictorially in the additional room portion 304, and more particularly in the patient room 368.

In one embodiment, these additional room portions are arranged in a predefined order in accordance with the plurality of sequential numerical indicia 307. For example, in this illustrative embodiment the light switch 329 and room inner doorknob 330 correspond to the number one, the call box button 331 and telephone 332 correspond to the number two, the bedside rails 333 and controls 334 on remote control devices correspond to the number three, the bedside table handles 335 correspond to the number four, the tray table 336 corresponds to the number five, the chair 337 corresponds to the number six, and the room sink 338 corresponds to the number seven. Accordingly, a person cleaning these portions would start with the portion associated with the number one, i.e., the light switch 329 and room inner doorknob 330, and then move sequentially through the portions in accordance with the plurality of sequential numerical indicia 307 to the number eight.

When cleaning the entire predefined portion, a person would clean the items in the additional room matrix 312 prior to the items in the restroom matrix 313 in this embodiment. For example, the person would start with the patient room 368, cleaning the portion associated with the number one, i.e., the light switch 329 and room inner doorknob 330, first. The person would then move sequentially through the portions in accordance with the plurality of sequential numerical indicia 307 to the number seven, i.e., the room sink 338. Next, the person would move to the restroom portion 314, cleaning the portion associated with the number one, i.e., the bathroom inner doorknob 322, initially. The person would then move sequentially through the portions in accordance with the plurality of sequential numerical indicia 307 to the number seven, i.e., the toilet seat 328, to complete the cleaning of the predefined area 306.

To make things easier for the person, rather than having to read the restroom matrix 313 and the additional room matrix 312, the corresponding items disposed therein, and the plurality of sequential numerical indicia 307, the additional room portion 304 can include a pictorial illustration of the hospital room with each item shown pictorially as well. A plurality of visual indicators can be assigned to the plurality of portions of the predefined area on a one-to-one basis. In this illustrative example, the light switch 329 and room inner doorknob 330 correspond to the first visual indicator 339, the call box button 331 and telephone 332 correspond to the second visual indicator 340, the bedside rails 333 and controls 334 on remote control devices correspond to the third visual indicator 341, the bedside table handles 335 correspond to the fourth visual indicator 342, the tray table 336 corresponds to the fifth visual indicator 343, the chair 337 corresponds to the sixth visual indicator 344, and the room sink 338 corresponds to the seventh visual indicator 345.

Similarly, in one embodiment the bathroom inner doorknob 322 corresponds to the an eight visual indicator 346, the bathroom light switch 323 corresponds to a ninth visual indicator 347, the bathroom sink 324 corresponds to a tenth visual indicator 348, the bathroom handrail by the toilet 325 corresponds to an eleventh visual indicator 349, the toilet bedpan cleaner 326 corresponds to a twelfth visual indicator 350, the toilet flush handle 327 corresponds to a thirteenth visual indicator 351, and the toilet seat 328 corresponds to a fourteenth visual indicator 352.

In one embodiment, each visual indicator 339,340,341, 342,343,344,345,356,347,348, 349, 350,351,352 is configured as a square with a number superimposed upon the square. For example, in one embodiment the first visual indicator 339 is a square with the number one superimposed on the circle, while the second visual indicator 340 is a square with the number two superimposed on the circle and so forth.

In one embodiment, each visual indicator 339,340,341, 342,343,344,345,356,347,348, 349, 350,351,352 is color coded as well. For example, in one embodiment the visual indicators 339,340,341,342,343,344,345 set forth in the additional room matrix 312 each comprise blue squares with white numbers disposed thereon, while the visual indicators 339,340,341,342,343, 344,345,356,347,348, 349, 350,351, 352 in the restroom matrix 313 each comprise red squares or green squares. This color-coding allows a person cleaning the predefined area 306 to quickly identify which portions of the predefined area 306 are to be cleaned first and which are to be cleaned second.

In this illustrative embodiment, the other indicia 316 comprise instructional information regarding how to use a microfiber booklet 370 in accordance with embodiments of the disclosure. Microfiber booklets 370 will be described in more detail below with reference to FIGS. 8-20 below. In one embodiment, the other indicia 316 comprise an instruction to use a first sheet 357 of a first microfiber booklet 358 first. The instructions can further request a user turn 359 sheets 360 of the microfiber booklet 358 as well. Additional turning instructions 361,362 can be provided as well to ensure that the user uses every sheet of the microfiber booklet 358 in the desired order to clean the various portions and contact surfaces and points of the rooms in the desired order. As noted above, if a particular user has not been properly trained to use a particular cleaning article, they may in fact cause more contamination than they reduce. Accordingly, in one embodiment the teaching insert 300 can include a pictorial representation how to use microfiber booklets 370 to provide yet even further instruction regarding proper cleaning techniques.

Figure 4:
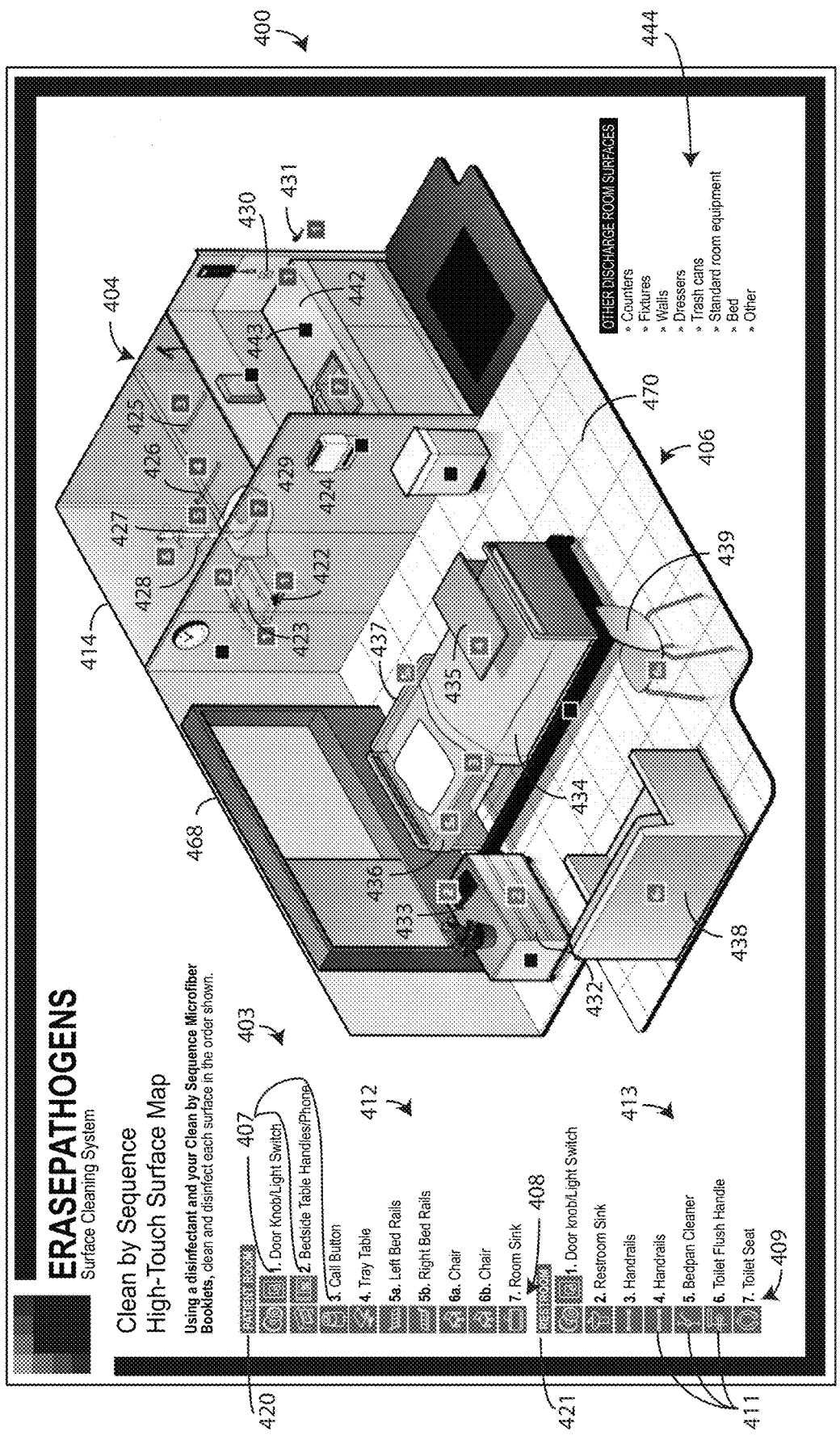
FIG. 4 illustrates a front side of another explanatory embodiment of a teaching aid in accordance with one or more embodiments of the disclosure.

Turning now to FIG. 4, illustrated therein is another explanatory teaching aid configured as a teaching insert 400 to be included with a cleaning package assembly, one of which will be shown below with reference to FIG. 21.

In the explanatory teaching insert 400 of FIG. 4, the predefined area (106) again comprises a hospital room. The additional room portion 404 of this teaching insert 400 illustrated the hospital room pictorially as a floor plan 470. In contrast to the floor plan (243) of FIG. 2, which was shown in a plan view, the floor plan 470 of FIG. 4 is shown in a three-dimensional isometric view. As noted above, other types of predefined areas can be substituted for the hospital room, including motel rooms, banquet rooms, restaurant dining rooms, locker rooms, classrooms, bathrooms, spas, sports stadiums, municipal and government buildings, and so forth.

A predefined area configured as an operating room will be described below with reference to FIGS. 6-7. Additionally, while three-dimensional isometric view and plan view are two ways in which the floor plan 470 can be shown, others can be used as well. For example, in another embodiment the floor plan 470 is shown as a three-dimensional physical model. In another embodiment, the floor plan 470 is shown as a "360-degree" virtual reality video. In yet another embodiment, the floor plan 470 is shown as a hologram. Other methods for presenting and displaying the floor plan 470 will be obvious to those of ordinary skill in the art having the benefit of this disclosure.

As with the visual teaching aid (100) of FIG. 1, the teaching insert 400 includes a legend portion 403 and an additional room portion 404. Here, the predefined area 406 is a hospital room. Accordingly, the legend portion 403 is subdivided into an additional room matrix 412 for the patient portion of the hospital room exterior to the restroom portion 414 and the restroom matrix 413 for the restroom portion 414 of the hospital room. In contrast to the legend portion (203) of FIG. 2, where the additional room matrix (212) for the patient portion of the hospital room exterior to the restroom portion (214) and the restroom matrix (213) for the restroom portion (214) of the hospital room were shown side by side, here the additional room matrix 412 for the patient portion of the hospital room exterior to the restroom portion 414 and the restroom matrix 413 for the restroom portion 414 of the hospital room are placed atop each other. As noted above, other geographical relationships between the additional room matrix 412 and the restroom matrix 413 will be obvious to those of ordinary skill in the art having the benefit of this disclosure.

As with the embodiment of FIG. 1, the legend portion 403 can define a plurality of portions of the hospital room, with each being listed in the legend portion 403 and shown pictorially in the additional room portion 404. In one embodiment, the restroom matrix 413 comprises a first subset 409 of a plurality of sequential alphanumeric indicia 407, while the additional room matrix 412 comprises a second subset 408 of the plurality of sequential alphanumeric indicia 407. In contrast to the embodiment of FIG. 2, where the first subset (209) and the second subset (208) were non-overlapping, here the first subset 409 and the second subset 408 include overlapping entries. In this illustrative embodiment, the first subset 409 of alphanumeric indicia 407 comprises the numbers one through seven, inclusive. By contrast, the second subset 408 of alphanumeric indicia 407 comprises two entries with substeps, resulting in the sequence being "1," "2," "3," "4," "5a," "5b," "6a," "6b," and "7." Other series of alphanumeric indicia will be described below with reference to FIG. 6. Still others will be obvious to those of ordinary skill in the art having the benefit of this disclosure.

As shown in FIG. 4, each of the restroom matrix 413 and the additional room matrix 412 comprise a 1×N matrix arranged in a column. A header 420,421, which is color coded in this embodiment with header 420 being blue while header 421 is orange, appears at the top of the additional room matrix 412 and the restroom matrix 413, respectively. Beneath the header 420,421 are found the first subset 409 and second subset 408 of the plurality of sequential alphanumeric indicia 407. Here, the second subset 408 comprises the numbers one through seven, inclusive, while the first subset 409 also comprises the numbers one through five, inclusive, with step five being broken into substep "5a" and substep "5b," and substep six being broken into substep "6a" and "6b."

In one embodiment, the restroom matrix 413 further defines restroom portions that are each associated with one of the plurality of sequential alphanumeric indicia 407 on a one-to-one basis. In this illustrative embodiment, the restroom portions comprise a bathroom inner doorknob 422 and a bathroom light switch 423, a bathroom sink 424, bathroom handrails on the wall 425, bathroom handrails by the toilet 426, a toilet bedpan cleaner 427, a toilet flush handle 428, and a toilet seat 429. Each of these items is illustrated pictorially in the additional room portion 404, and more particularly in the restroom portion 414.

In one embodiment, these restroom portions are arranged in a predefined order in accordance with the plurality of sequential alphanumeric indicia 407. Some of the elements can be combined so as to keep the number of sequential alphanumeric indicia 407 limited below a predefined threshold, such as seven or nine. For example, in this illustrative embodiment the bathroom inner doorknob 422 and the bathroom light switch 423 correspond to the number one, the bathroom sink 424 corresponds to the number two, the bathroom handrail on the wall 425 corresponds to the number three, the bathroom handrail by the toilet 426 corresponds to the number four, the toilet bedpan cleaner 427 corresponds to the number five, the toilet flush handle 428 corresponds to the number six, and the toilet seat 429 corresponds to the number seven. Accordingly, a person cleaning these portions would start with the portion associated with the number one, i.e., bathroom inner doorknob 422, and then move sequentially through the portions in accordance with the plurality of sequential alphanumeric indicia 407 to the number seven.

Similarly, in one embodiment the additional room matrix 412 defines additional room portions that are each associated with one of the plurality of sequential alphanumeric indicia 407 on a one-to-one basis. As before, some of the elements can be combined so as to keep the number of sequential alphanumeric indicia 407 limited below a predefined threshold, such as seven or nine, and which include substeps. For example, in this illustrative embodiment the additional room portions comprise a light switch 430 and room inner doorknob 431, handles and of a bedside table 432 and a phone 433, a call box button 434, a tray table 435, left bedside rails 436, right bedside rails 437, a chair 438, another chair 439, and a room sink 440. Each of these items is then illustrated pictorially in the additional room portion 404, and more particularly in the patient room 468.

In one embodiment, these additional room portions are arranged in a predefined order in accordance with the plurality of sequential alphanumeric indicia 407. For example, in this illustrative embodiment the light switch 430 and room inner doorknob 431 correspond to the number one, the handles and of a bedside table 432 and the phone 433 correspond to the number two, the call box button 434 corresponds to the number three, the tray table 435 corresponds to the number four, the left bedside rails 436 correspond to substep "5a," the right bedside rails 437 correspond to substep "5b," the chair 438 corresponds to substep "6a," the other chair 439 corresponds to substep "6b," and the room sink 440 corresponds to the number seven. Each of these items is then illustrated pictorially in the additional room portion 404, and more particularly in the patient room 468. Accordingly, a person cleaning these portions would start with the portion associated with the number one, i.e., the light switch 430 and room inner doorknob 431, and then move sequentially through the portions in accordance with the plurality of sequential alphanumeric indicia 407 to the number seven.

As noted above, in one or more embodiments the microfiber booklets suitable for use with the teaching insert 400 include not only alphanumeric indicia indicating a predefined order, but also include graphical illustrations identifying objects to be cleaned in accordance with that predefined order. In the illustrative embodiment of FIG. 4, these graphical illustrations 447 are also placed adjacent to the plurality of sequential alphanumeric indicia 407 so that the person can associate a particular page of the microfiber booklets with a portion of the predefined area.

Figure 5:
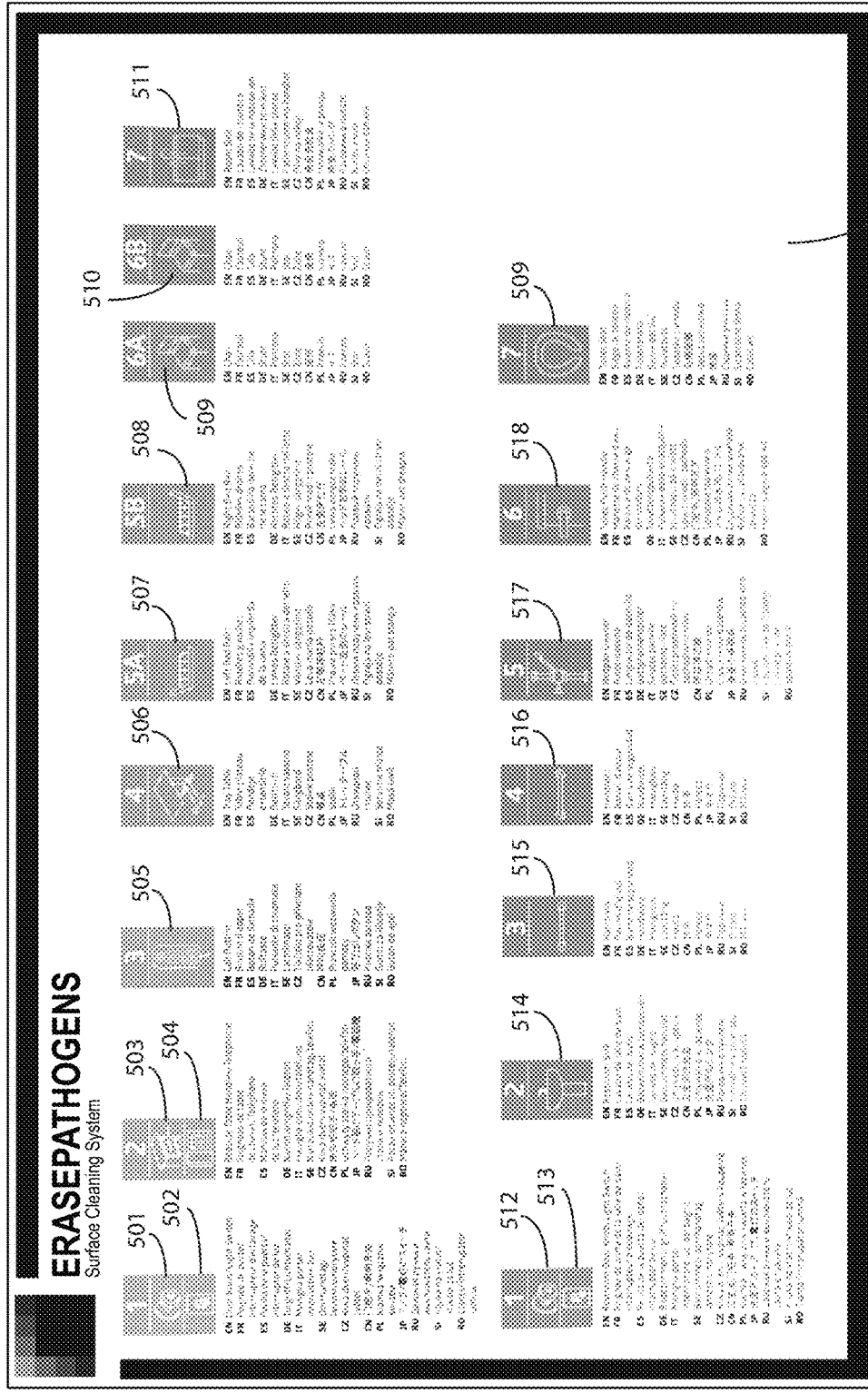
FIG. 5 illustrates a rear side of the explanatory embodiment of the teaching aid of FIG. 4.

Turning briefly to FIG. 5, illustrated therein is a rear side 500 of the teaching aid 400 of FIG. 4. The rear side 500 of the teaching aid 400 illustrates the graphical illustrations 447 placed adjacent to the plurality of sequential alphanumeric indicia (407) in greater detail.

In this illustrative embodiment, where the light switch (430) and room inner doorknob (431) correspond to the number one, a first graphical illustration 501, placed under the number "1," can depict a doorknob, while a second graphical illustration 502 depicts a light switch. The first graphical illustration 501 and the second graphical illustration 502 are also shown in the restroom matrix (413) in FIG. 4.

Since, in this illustrative embodiment, the handles and of a bedside table (432) and the phone (433) correspond to the number two, in one or more embodiments a third graphical illustration 503, placed under the number "2," can depict a bedside table with an arrow pointing to the handles, while a fourth graphical illustration 504 can depict a phone. The third graphical illustration 503 and the fourth graphical illustration 504 are also shown in the restroom matrix (413) in FIG. 4.

Since, in this illustrative embodiment, the call box button (434) corresponds to the number three, a fifth graphical illustration 505, placed under the number "3," can depict a call button. The fifth graphical illustration 505 is also shown in the restroom matrix (413) in FIG. 4.

Since, in this illustrative embodiment, the tray table (435) corresponds to the number four, a sixth graphical illustration 506, placed under the number "4," can depict a tray table. The sixth graphical illustration 506 and the second graphical illustration 502 are also shown in the restroom matrix (413) in FIG. 4.

Since, in this illustrative embodiment, the left bedside rails (436) correspond to substep "5a," a seventh graphical illustration 507, placed under the alphanumeric indicator "5A," can depict beside rails. Since, in this illustrative embodiment, the right bedside rails (437) correspond to substep "5b," an eighth graphical illustration 508, placed under the alphanumeric indicator "5B," can depict bedside rails as well. The seventh graphical illustration 507 and the eighth graphical illustration 508 are also shown in the restroom matrix (413) in FIG. 4.

Since, in this illustrative embodiment, the chair (438) corresponds to substep "6a," a ninth graphical illustration 509, placed under the alphanumeric indicator "6A," can depict a chair. Since, in this illustrative embodiment, the other chair (439) corresponds to substep "6b," a tenth graphical illustration 510, placed under the alphanumeric indicator "6B," can also depict a chair. The ninth graphical illustration 509 and the tenth graphical illustration 510 are also shown in the restroom matrix (413) in FIG. 4.

Since, in this illustrative embodiment, the room sink (440) corresponds to the number seven, an eleventh graphical illustration 511, placed under the number "7," can depict a sink. The eleventh graphical illustration 511 is also shown in the restroom matrix (413) in FIG. 4.

The portions of the restroom can be similarly depicted. Since, in this illustrative embodiment, the bathroom inner doorknob (422) and the bathroom light switch (423) correspond to the number one, a twelfth graphical illustration 512, placed under the number "1," while a thirteenth graphical illustration 513, similarly placed, can depict a light switch. The twelfth graphical illustration 512 and the thirteenth graphical illustration 513 are also shown in the additional room matrix (412) in FIG. 4.

Since, in this illustrative embodiment, the bathroom sink (424) corresponds to the number two, a fourteenth graphical illustration 514, placed under the number "2," can depict a sink. The fourteenth graphical illustration 514 is also shown in the additional room matrix (412) in FIG. 4.

Since, in this illustrative embodiment, the bathroom handrail on the wall (425) corresponds to the number three, a fifteenth graphical illustration 515, placed under the number "3," can depict a handrail. The fifteenth graphical illustration 515 is also shown in the additional room matrix (412) in FIG. 4.

Since, in this illustrative embodiment, the bathroom handrail by the toilet (426 corresponds to the number four, a sixteenth graphical illustration 516, placed under the number "4," can depict a handrail. The sixteenth graphical illustration 516 is also shown in the additional room matrix (412) in FIG. 4.

Since, in this illustrative embodiment, the toilet bedpan cleaner 427 corresponds to the number five, a seventeenth graphical illustration 517, placed under the number "5," can depict a toilet bedpan cleaner. The seventeenth graphical illustration 517 is also shown in the additional room matrix (412) in FIG. 4.

Since, in this illustrative embodiment, the toilet flush handle 428 corresponds to the number six, an eighteenth graphical illustration 518, placed under the number "6," can depict a toilet flush handle. The eighteenth graphical illustration 518 is also shown in the additional room matrix (412) in FIG. 4.

Since, in this illustrative embodiment, the toilet seat 429 corresponds to the number seven, a nineteenth graphical illustration 519, placed under the number "7," can depict a toilet seat. The nineteenth graphical illustration 519 is also shown in the additional room matrix (412) in FIG. 4.

In one or more embodiments, the rear side 500 of the teaching insert 400 can include a matrix of these graphical illustrations 501-519 with language translations, e.g., language translation 520, shown therewith. In one or more embodiments, each graphical illustration 501-519 includes a corresponding language translation. Advantageously, the language translations allow speakers of a plurality of languages to easily determine what each graphical illustration 501,519 identifies. For example, the language translation 520 associated with the ninth graphical illustration 509, which depicts a chair, may be placed beneath the ninth graphical illustration 509 on the rear side 500 of the teaching insert. In this illustrative embodiment, the language translation 520 for the ninth graphical illustration 509 comprises the word "chair" for English speakers, "fauteuil" for French speakers, "silla" for Spanish speakers, "stuhl" for German speakers, "poltrona" for Italian speakers, "stol" for Swedish speakers, "zidle" for Czech speakers, Chinese characters for Chinese speakers, "krzesto" for Polish speakers, Japanese characters for Japanese speakers, "kpecno" for Russian speakers, "stol" for Slovenian speakers, "scaun" for Romanian speakers, and so forth. Each of the language translations associated with the other graphical illustrations 501-508,510-519 is similarly configured.

Turning now back to FIG. 4, when cleaning the entire predefined area, a person would clean the items in the additional room matrix 412 prior to the items in the restroom matrix 413 in this illustrative example. For example, the person would start with the patient room 468, cleaning the portion associated with the number one, i.e., the light switch 430 and room inner doorknob 431, first. The person would then move sequentially through the portions in accordance with the plurality of sequential alphanumeric indicia 407 to the number seven, i.e., moving next to the bedside tables 432 and phone 433.

Next, the person would move to the restroom portion 414, cleaning the portion associated with the number one, i.e., the bathroom inner doorknob 422 and bathroom switch 423, initially. The person would then move sequentially through the portions in accordance with the plurality of sequential alphanumeric indicia 407 to the number seven, i.e., the toilet seat 429, to complete the cleaning of the predefined area 406.

To make things easier for the person, rather than having to read the restroom matrix 413 and the additional room matrix 412, the corresponding items disposed therein, and the plurality of sequential alphanumeric indicia 407, the additional room portion 404 can include a pictorial illustration of the hospital room with each item shown pictorially as well.

As before, plurality of visual indicators can be assigned to the plurality of portions of the predefined area to identify objects that are to be cleaned with the microfiber booklets. In one or more embodiments, these visual indicators are assigned to portions of the predefined area on a one-to-one basis. In this illustrative example, the light switch 430 and room inner doorknob 431 correspond to a first visual indicator, shown as a blue box with the number "1" in it, while the handles and of a bedside table 432 and the phone 433 correspond to a second visual indicator, shown as a blue box with the number "2" in it. The call box button 434 correspond to a third visual indicator, shown as a blue box with the number "3" in it. The tray table 435 corresponds to a fourth visual indicator, shown as a blue box with the number "4" in it. The left bedside rails 436 correspond to a fifth visual indicator, shown as a blue box with the alphanumeric indicator "5a" in it. The right bedside rails 437 correspond to a sixth visual indicator, shown as a blue box with the alphanumeric indicator "5b" in it. The chair 438 corresponds to a seventh visual indicator, shown as a blue box with the alphanumeric indicator "6a" in it. The other chair 439 corresponds to an eighth visual indicator, shown as a blue box with the alphanumeric indicator "6b" in it. The room sink 440 corresponds to a ninth visual indicator, shown as a blue box with the number "7" in it. Each of these items is then illustrated pictorially in the additional room portion 404, and more particularly in the patient room 468

Similarly, in one embodiment the bathroom inner doorknob 422 and the bathroom light switch 423 correspond to a tenth visual indicator and an eleventh visual indicator, respectively, each shown as an orange blue box with the number "1" in it. The bathroom sink 424 corresponds to a twelfth visual indicator, shown as an orange box with the number "2" in it. The bathroom handrail on the wall 425 corresponds to a thirteenth visual indicator, shown as an orang box with the number "3" in it. The bathroom handrail by the toilet 426 corresponds to a fourteenth visual indicator, shown as an orange box with the number "4" in it. The toilet bedpan cleaner 427 corresponds to a sixteenth visual indicator, shown as an orange box with the number "5" in it. The toilet flush handle 428 corresponds to a seventeenth visual indicator, shown as an orange box with the number "6" in it. The toilet seat 429 corresponds to an eighteenth visual indicator, shown as an orange box with the number "7" in it.

In this illustrative embodiment, each visual indicator is configured as a square with a number superimposed upon the square. For example, in one embodiment the first visual indicator is a square with the number one superimposed on the square, while the second visual indicator is a square with the number two superimposed on the square and so forth.

In one embodiment, each visual indicator is color coded as well. For example, in one embodiment the visual indicators set forth in the additional room matrix 412 each comprise blue squares with white numbers disposed thereon, while the visual indicators in the restroom matrix 413 each comprise orange squares with white numbers disposed thereon. This color-coding allows a person cleaning the predefined area 406 to quickly identify which portions of the predefined area 406 are to be cleaned first and which are to be cleaned second.

A plurality of other visual indicators can be assigned to the plurality of portions of the predefined area to identify objects that are to be cleaned with normal cleaning products, such as paper towels, towels, mops, and disinfectants. For example, the in the illustrative embodiment of FIG. 4, the patient room sink countertop 442 includes a box 443, with a miscellaneous matrix 444 confirming that objects and materials other than the microfiber booklets should be used to clean this surface. In the illustrative embodiment of FIG. 4, the sides of the bedside table, the walls, the trash can, and the paper towel dispensers all include such visual indicators.

The teaching insert 400 of FIG. 4 can be included with a cleaning package assembly, as will be shown below with reference to FIG. 21. In one or more embodiments, the cleaning package assembly includes the teaching insert 400 and one or more cleaning cloths. Alternatively, in other embodiments, the cleaning package assembly includes the teaching insert 400 and one or more microfiber booklets, examples of which will be shown and described with reference to FIGS. 17-20 below, in which each microfiber sheet includes one alphanumeric indicium of the plurality of alphanumeric indicia 407 and one or more of the graphical illustrations described above with reference to FIG. 5. Other types of cleaning tools suitable for inclusion with the teaching insert 400 will be obvious to those of ordinary skill in the art having the benefit of this disclosure.

Figure 6:
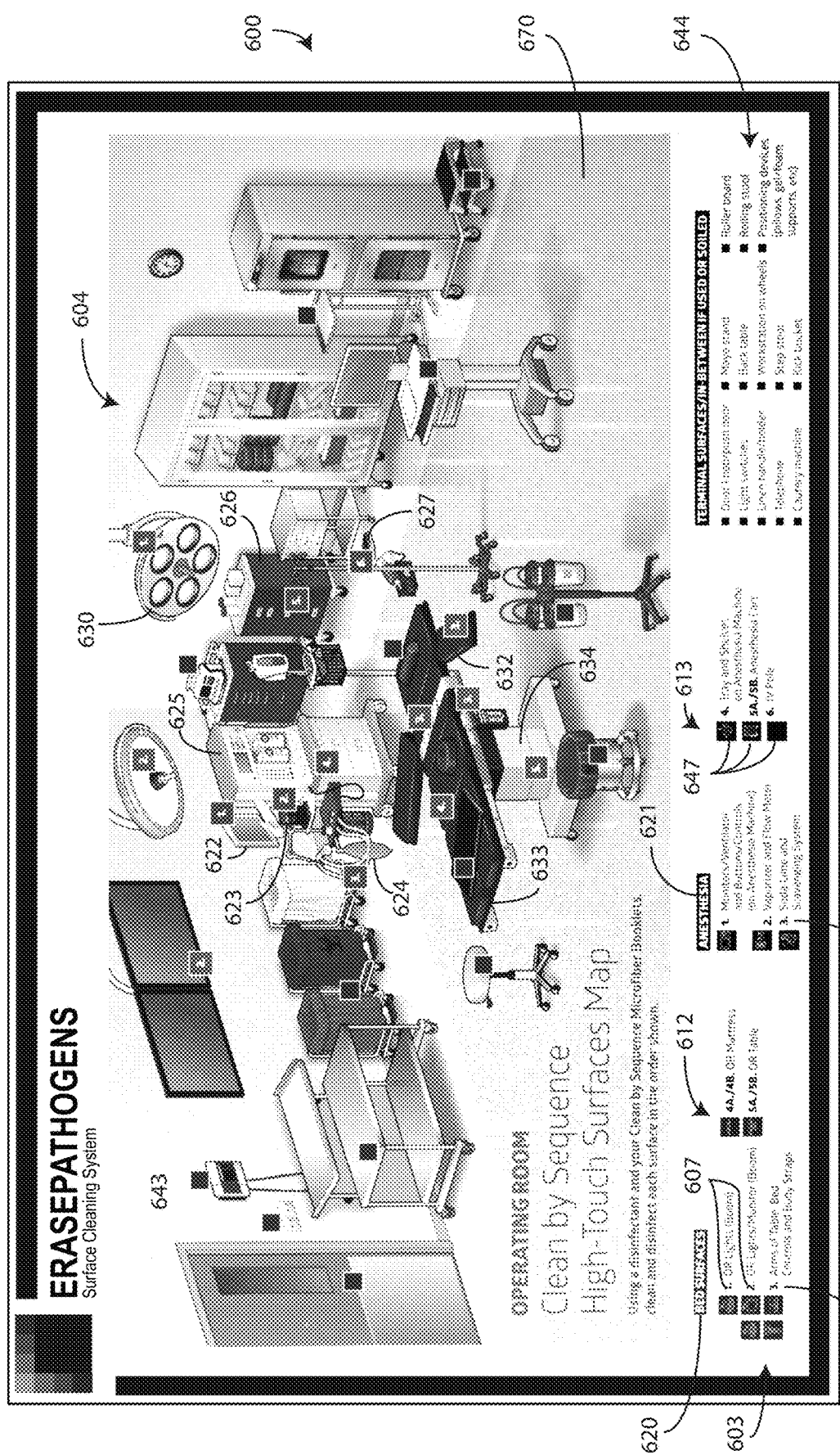
FIG. 6 illustrates a front side of still another explanatory embodiment of a teaching aid in accordance with one or more embodiments of the disclosure.

Turning now to FIG. 6, illustrated therein is another explanatory teaching aid configured as a teaching insert 600 to be included with a cleaning package assembly, one of which will be shown below with reference to FIG. 21.

In the explanatory teaching insert 600 of FIG. 6, the predefined area (106) comprises an operating room. The additional room portion 604 of this teaching insert 600 illustrates the operating room pictorially as a floor plan 670. In contrast to the floor plan (243) of FIG. 2, which was shown in a plan view, the floor plan 670 of FIG. 6 is shown in a three-dimensional isometric view. As noted above, other types of predefined areas can be substituted for the hospital room, including motel rooms, banquet rooms, restaurant dining rooms, locker rooms, classrooms, bathrooms, spas, sports stadiums, municipal and government buildings, and so forth.

Additionally, while three-dimensional isometric view and plan view are two ways in which the floor plan 670 can be shown, others can be used as well. For example, in another embodiment the floor plan 670 is shown as a three-dimensional physical model. In another embodiment, the floor plan 670 is shown as a "360-degree" virtual reality video. In yet another embodiment, the floor plan 670 is shown as a hologram. Other methods for presenting and displaying the floor plan 670 will be obvious to those of ordinary skill in the art having the benefit of this disclosure.

As with the visual teaching aid (100) of FIG. 1, the teaching insert 600 includes a legend portion 603 and an additional room portion 604. Here, the predefined area 606 is an operating room. Accordingly, there is no second portion similar to the restroom portion (414) of FIG. 4. Instead, the additional room portion 604 depicts a single space, which is an operating room.

However, in this illustrative embodiment this single space is divided into functional areas. These functional areas include those surfaces associated with the operating bed, and those surfaces associated with anesthesia equipment. Accordingly, the legend portion 603 is subdivided into a second functional area matrix 612 for the bed surfaces of the operating room and a first functional area matrix 613 for the anesthesia devices of the operating room. As with the legend portion (203) of FIG. 2, where the additional room matrix (212) for the patient portion of the hospital room exterior to the restroom portion (214) and the restroom matrix (213) for the restroom portion (214) of the hospital room were shown side by side, so too are the second functional area matrix 612 and the first functional area matrix 613 of FIG. 6. As noted above, other geographical relationships between the second functional area matrix 612 and the first functional area matrix 613 will be obvious to those of ordinary skill in the art having the benefit of this disclosure.

As with the embodiment of FIG. 1, the legend portion 603 can define a plurality of portions of the operating room, with each being listed in the legend portion 603 and shown pictorially in the additional room portion 604. In one embodiment, the second functional area matrix 613 comprises a first subset 609 of a plurality of sequential alphanumeric indicia 607, while the second functional area matrix 612 comprises a second subset 608 of the plurality of sequential alphanumeric indicia 607. In contrast to the embodiment of FIG. 2, where the first subset (209) and the second subset (208) were non-overlapping, here the first subset of alphanumeric indicia 609 and the second subset of alphanumeric indicia 608 include overlapping entries. In this illustrative embodiment, the first set of alphanumeric indicia 609 comprises one entry with substeps, resulting in the sequence being "1," "2," "3," "4," "5a," "5b," and "6." The second subset of alphanumeric indicia 408 comprises two entries with substeps, resulting in the sequence being "1," "2," "3," "4a," "4b," "5a," and "5b." Other series of alphanumeric indicia will be obvious to those of ordinary skill in the art having the benefit of this disclosure.

As shown in FIG. 6, each of the second functional area matrix 612 and the first functional area matrix 613 comprise a 1×N matrix arranged side-by-side. A header 620,621, which is color coded in this embodiment with header 620 being green while header 621 is grey, appears at the top of the second functional area matrix 612 and the first functional area matrix 613, respectively. Beneath the header 620,621 are found the first subset 609 and second subset 608 of the plurality of sequential alphanumeric indicia 607. Here, the second subset of alphanumeric indicia 608 comprises the numbers one through inclusive, with step four being broken into substep "4a" and substep "4b," and substep five being broken into substep "5a" and "5b." The first subset of alphanumeric indicia 609 comprises "1," "2," "3," "4," "5a," and "5b," dividing step 5 into two substeps.

In one embodiment, second functional area matrix 613 further defines operating portions that are each associated with one of the plurality of sequential alphanumeric indicia 607 on a one-to-one basis. In this illustrative embodiment, the anesthesia portions of the operating room comprise a monitor 622 and corresponding ventilator, buttons, and controls, a vaporizer and flow meter 623, a soda lime and scavenging system 624, a tray and shelves on an anesthesia machine 625, an anesthesia cart 626, and an intravenous fluid pole 627. Each of these items is illustrated pictorially in the additional room portion 604.

In one embodiment, these anesthesia portions are arranged in a predefined order in accordance with the plurality of sequential alphanumeric indicia 607. Some of the elements can be combined so as to keep the number of sequential alphanumeric indicia 607 limited below a predefined threshold, such as five or six. For example, in this illustrative embodiment the monitor 622 and corresponding ventilator, buttons, and controls correspond to the number one, the vaporizer and flow meter 623 corresponds to the number two, the soda lime and scavenging system 624 corresponds to the number three, the tray and shelves on an anesthesia machine 625 corresponds to the number four, the anesthesia cart 626 corresponds to the number five, and the intravenous fluid pole 627 corresponds to the number six. Accordingly, a person cleaning these portions would start with the portion associated with the number one, i.e., monitor 622 and corresponding ventilator, buttons, and controls, and then move sequentially through the portions in accordance with the plurality of sequential alphanumeric indicia 607 to the number six.

Similarly, in one embodiment the second functional area matrix 612 defines additional operating room portions that are each associated with one of the plurality of sequential alphanumeric indicia 607 on a one-to-one basis. As before, some of the elements can be combined so as to keep the number of sequential alphanumeric indicia 607 limited below a predefined threshold, such as five or six, and which include substeps. For example, in this illustrative embodiment the bed surface portions comprise an operating room light 630, other operating lights and/or monitors 631, arms of a table, a bed, and body straps 632, an operating room mattress 633, and an operating room table 634. Each of these items is then illustrated pictorially in the additional room portion 604.

In one embodiment, these additional room portions are arranged in a predefined order in accordance with the plurality of sequential alphanumeric indicia 407. For example, in this illustrative embodiment the operating room light 630 corresponds to the number one, the other operating lights and/or monitors 631 correspond to the number two, the arms of a table, a bed, and body straps 632 correspond to the number three, the operating room mattress 633 corresponds to the number four, or alternatively to substep "4a" and substep "4b." The operating room table 634 corresponds to the number five, or alternatively to substep "5a" and substep "5b." Each of these items is then illustrated pictorially in the additional room portion 604. Accordingly, a person cleaning these portions would start with the portion associated with the number one, i.e., the operating room light 630, and then move sequentially through the portions in accordance with the plurality of sequential alphanumeric indicia 607 to the number five.

In one or more embodiments the microfiber booklets suitable for use with the teaching insert 600 include not only alphanumeric indicia indicating a predefined order, but also include graphical illustrations identifying objects to be cleaned in accordance with that predefined order. In the illustrative embodiment of FIG. 6, these graphical illustrations 647 are also placed adjacent to the plurality of sequential alphanumeric indicia 607 so that the person can associate a particular page of the microfiber booklets with a portion of the predefined area.

Figure 7:
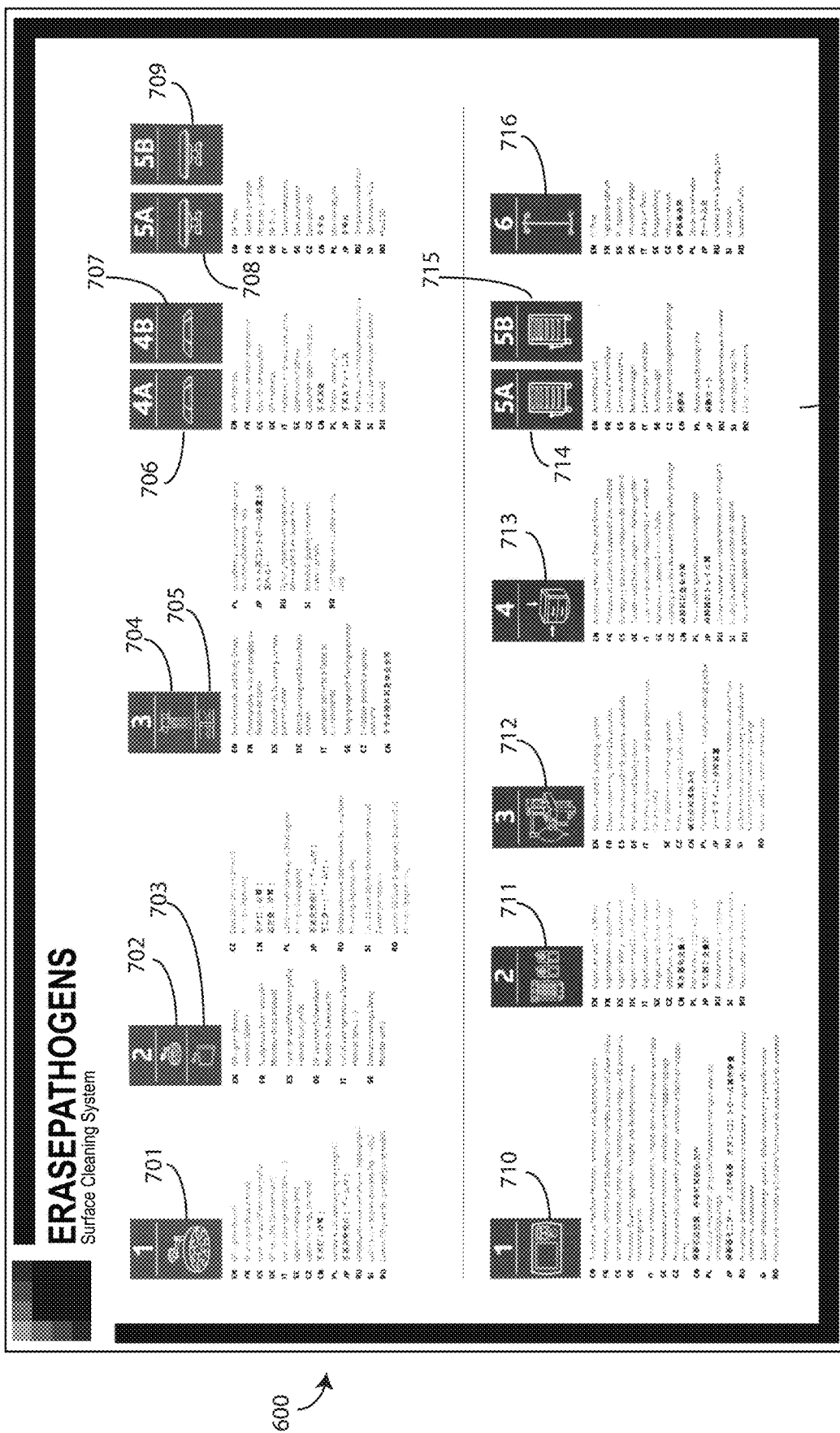
FIG. 7 illustrates a rear side of the explanatory embodiment of the teaching aid of FIG. 6.

Turning briefly to FIG. 7, illustrated therein is a rear side 700 of the teaching insert 600 of FIG. 6. The rear side 700 of the teaching insert 600 illustrates the graphical illustrations (647) placed adjacent to the plurality of sequential alphanumeric indicia (407) in greater detail.

In this illustrative embodiment, where the operating room light (630) corresponds to the number one, a first graphical illustration 701, placed under the number "1," can depict an operating room light. The first graphical illustration 701 is also shown in the second functional area matrix (612) in FIG. 6.

Since, in this illustrative embodiment, the other operating lights and/or monitors (631) correspond to the number two, in one or more embodiments a second graphical illustration 702 and a third graphical illustration 703, placed under the number "2," can depict another operating light and a monitor, respectively. The second graphical illustration 702 and the third graphical illustration 703 are also shown in the second functional area matrix (612) in FIG. 6.

Since, in this illustrative embodiment, the arms of a table, a bed, and body straps (632) correspond to the number three, a fourth graphical illustration 704 and a fifth graphical illustration, placed under the number "3," can depict arms of a table, a bed, and body straps. The fourth graphical illustration 704 and the fifth graphical illustration 705 are also shown in the second functional area matrix (612) in FIG. 6.

Since, in this illustrative embodiment, the operating room mattress (633) corresponds to the number four, a sixth graphical illustration 706, placed under the alphanumeric indicator "4a," can depict a mattress, while a seventh graphical illustration 707, placed under the alphanumeric indicator "4b," can depict the same. The sixth graphical illustration 706 and the seventh graphical illustration 702 are also shown in the second functional area matrix (612) in FIG. 6.

Since, in this illustrative embodiment, the operating room table (634) corresponds to substep "5a" and substep "5b," an eighth graphical illustration 708, placed under the alphanumeric indicator "5A," can depict an operating table, while a ninth graphical illustration 709, placed under the alphanumeric indicator "5B," can depict the same. The eighth graphical illustration 708 and the ninth graphical illustration 709 are also shown in the second functional area matrix (612) in FIG. 6.

The portions of the anesthesia area can be similarly depicted. Since, in this illustrative embodiment, the monitor (622) and corresponding ventilator, buttons, and controls correspond to the number one, a tenth graphical illustration 710, placed under the number "1," can depict a monitor. The tenth graphical illustration 710 is also shown in the first functional area matrix (613) in FIG. 6.

Since, in this illustrative embodiment, the vaporizer and flow meter (623) corresponds to the number two, an eleventh graphical illustration 711, placed under the number "2," can depict a vaporizer and flow meter. The eleventh graphical illustration 711 is also shown in the first functional area matrix (613) in FIG. 6.

Since, in this illustrative embodiment, the soda lime and scavenging system (624) corresponds to the number three, a twelfth graphical illustration 712, placed under the number "3," can depict a soda lime and scavenging system. The twelfth graphical illustration 712 is also shown in the first functional area matrix (613) in FIG. 6.

Since, in this illustrative embodiment, the tray and shelves on an anesthesia machine (625) corresponds to the number four, a thirteenth graphical illustration 713, placed under the number "4," can depict a an anesthesia machine, with arrows pointing to the tray and shelves. The thirteenth graphical illustration 713 is also shown in the first functional area matrix (613) in FIG. 6.

Since, in this illustrative embodiment, the anesthesia cart (626) corresponds to the number five, a fourteenth graphical illustration 714, placed under the alphanumeric indicator "5a," can depict an anesthesia cart, as can a fifteenth graphical illustration 715, placed under the alphanumeric indicator "5b." The fourteenth graphical illustration 714 and the fifteenth graphical illustration are also shown in the first functional area matrix (613) in FIG. 6.

Since, in this illustrative embodiment, the intravenous fluid pole (627) corresponds to the number six, a sixteenth graphical illustration 716, placed under the number "6," can depict an intravenous fluid pole. The sixteenth graphical illustration 716 is also shown in the first functional area matrix (613) in FIG. 6.

In one or more embodiments, the rear side 700 of the teaching insert 600 can include a matrix of these graphical illustrations 701-716 with language translations, e.g., language translation 720, shown therewith. In one or more embodiments, each graphical illustration 701-716 includes a corresponding language translation. Advantageously, the language translations allow speakers of a plurality of languages to easily determine what each graphical illustration 701-716 identifies. For example, the language translation 720 associated with the tenth graphical illustration 710 and eleventh graphical illustration 711, which depicts an operating table, may be placed beneath tenth graphical illustration 710 and eleventh graphical illustration 711 on the rear side 700 of the teaching insert 600. In this illustrative embodiment, the language translation 720 for tenth graphical illustration 710 and eleventh graphical illustration 711 comprises the words "OR table" for English speakers, "table d'operation" for French speakers, "mesa de quirofano" for Spanish speakers, "OP-tisch" for German speakers, "tavolo operatorio" for Italian speakers, "operationsbord" for Swedish speakers, "Operanci stul" for Czech speakers, Chinese characters for Chinese speakers, "stol opracyjny" for Polish speakers, Japanese characters for Japanese speakers, Russian characters for Russian speakers, "operacijska miza" for Slovenian speakers, "Masa SO" for Romanian speakers, and so forth. Each of the language translations associated with the other graphical illustrations 701-709,712-716 is similarly configured.

Turning now back to FIG. 6, when cleaning the entire predefined area, a person would clean the items in the second functional area matrix 612 prior to the items in the first functional area matrix 613 in this illustrative example. For example, the person would start by cleaning bed surfaces area at the portion associated with the number one, i.e., the operating room lights 630, first. The person would then move sequentially through the portions in accordance with the plurality of sequential alphanumeric indicia 607 to the number five, i.e., moving next to the other lights and monitor 631.

Next, the person would move to the anesthesia portion, cleaning the portion associated with the number one, i.e., the monitor 622 and corresponding ventilator, buttons, and controls, initially. The person would then move sequentially through the portions in accordance with the plurality of sequential alphanumeric indicia 607 to the number six, i.e., the intravenous fluid pole 627, to complete the cleaning of the anesthesia portion of the operating room.

To make things easier for the person, rather than having to read the first functional area matrix 613 and the second functional area matrix 612, the corresponding items disposed therein, and the plurality of sequential alphanumeric indicia 607, the additional room portion 604 can include a pictorial illustration of the operating room with each item shown pictorially as well.

As before, plurality of visual indicators can be assigned to the plurality of portions of the predefined area to identify objects that are to be cleaned with the microfiber booklets. In one or more embodiments, these visual indicators are assigned to portions of the predefined area on a one-to-one basis. In this illustrative example, the monitor 622 and corresponding ventilator, buttons, and controls correspond to a first visual indicator, shown as a green box with the number "1" in it, while the vaporizer and flow meter 623 correspond to a second visual indicator, shown as a green box with the number "2" in it. The soda lime and scavenging system 624 correspond to a third visual indicator, shown as a green box with the number "3" in it. The tray and shelves on an anesthesia machine 625 correspond to a fourth visual indicator, shown as a green box with the number "4" in it. The anesthesia cart 626 corresponds to a fifth visual indicator and a sixth visual indicator, each shown graphically as green boxes with the alphanumeric indicators "5a" and "5b," respectively, in each. The intravenous fluid pole 627 corresponds to a seventh visual indicator, shown as a green box with the number "6" in it. Each of these items is then illustrated pictorially in the additional room portion 604.

Similarly, in one embodiment the operating room light 630 corresponds to an eighth tenth visual indicator, each shown as a grey box with the number "1" in it. The other operating lights and/or monitors 631 correspond to a ninth visual indicator, shown as a grey box with the number "2" in it. The arms of a table, a bed, and body straps 632 correspond to a tenth visual indicator, shown as a grey box with the number "3" in it. The operating room mattress 633 corresponds to an eleventh visual indicator and a twelfth visual indicator, each shown graphically as grey boxes with the alphanumeric indicators "4a" and "4b," respectively, in each. The operating room table 634 corresponds to a thirteenth visual indicator and a fourteenth visual indicator, each shown graphically as green boxes with the alphanumeric indicators "5a" and "5b," respectively, in each.

In this illustrative embodiment, each visual indicator is configured as a square with a number superimposed upon the square. For example, in one embodiment the first visual indicator is a square with the number one superimposed on the square, while the second visual indicator is a square with the number two superimposed on the square and so forth.

In one embodiment, each visual indicator is color coded as well. For example, in one embodiment the visual indicators set forth in the second functional area matrix 612 each comprise green squares with white numbers disposed thereon, while the visual indicators in the first functional area matrix 613 each comprise grey squares with white numbers thereon. This color-coding allows a person cleaning the predefined area 606 to quickly identify which portions of the predefined area 606 are to be cleaned first and which are to be cleaned second.

A plurality of other visual indicators can be assigned to the plurality of portions of the predefined area to identify objects that are to be cleaned with normal cleaning products, such as paper towels, towels, mops, and disinfectants. For example, the in the illustrative embodiment of FIG. 6, the push door, door knob, light switches, linen handles, telephone, cautery machine, Mayo stand, back table, workstation on wheels, step stool, kick bucket, roller board, rolling stool, and positioning devices each include a box, e.g., box 643. A miscellaneous matrix 644 then confirms that objects and materials other than the microfiber booklets should be used to clean this surface.

The teaching insert 600 of FIG. 6 can be included with a cleaning package assembly, as will be shown below with reference to FIG. 21. In one or more embodiments, the cleaning package assembly includes the teaching insert 600 and one or more cleaning cloths. Alternatively, in other embodiments, the cleaning package assembly includes the teaching insert 600 and one or more microfiber booklets, examples of which will be shown and described with reference to FIGS. 17-20 below, in which each microfiber sheet includes one alphanumeric indicium of the plurality of alphanumeric indicia 607 and one or more of the graphical illustrations described above with reference to FIG. 7. Other types of cleaning tools suitable for inclusion with the teaching insert 600 will be obvious to those of ordinary skill in the art having the benefit of this disclosure.

Figure 8:
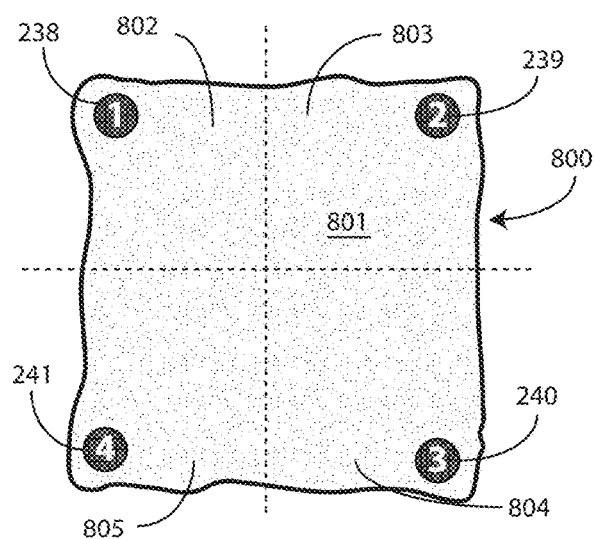
FIGS. 8-11 illustrate explanatory cleaning articles to be included in a system with a teaching insert in accordance with one or more embodiments of the disclosure.
Figure 9:
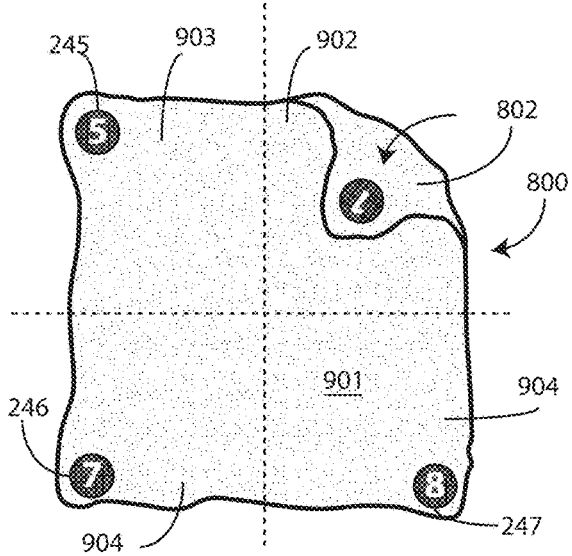
Figure 10:
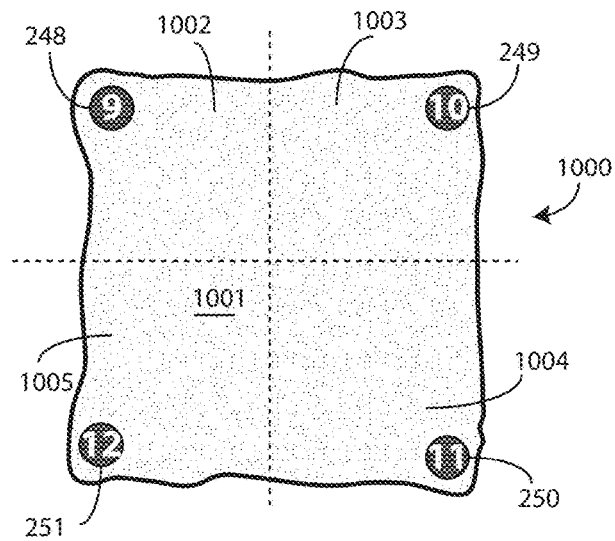
Figure 11:
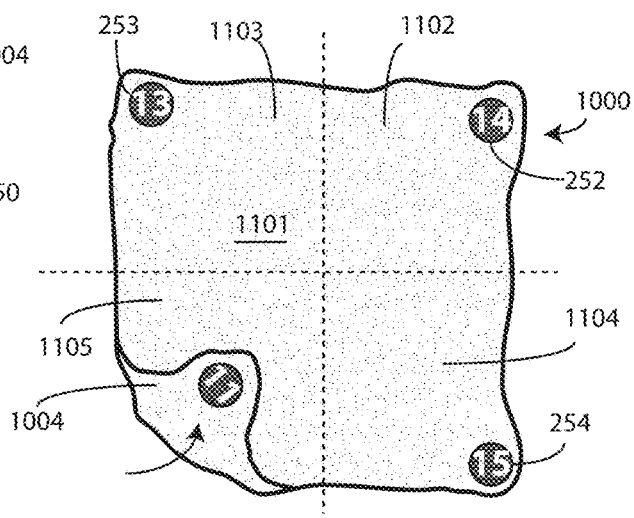

Turning now to FIGS. 8-11, illustrated therein are explanatory cleaning cloths configured in accordance with one or more embodiments of the disclosure. FIG. 8 illustrates a front side 801 of a first cleaning cloth 800, while FIG. 9 illustrated the rear side 901 of the first cleaning cloth 800. Similarly, FIG. 10 illustrates the front side 1001 of a second cleaning cloth 1000, while FIG. 11 illustrated the rear side 1101 of the second cleaning cloth 1000.

In one or more embodiments, each cleaning cloth 800, 1000 defines a plurality of portions thereof. For example, in one embodiment the front side 801 of the first cleaning cloth defines a first portion 802, a second portion 803, a third portion 804, and a fourth portion 805. The rear side 901 of the first cleaning cloth 800 then defines a fifth portion 902, a sixth portion 903, a seventh portion 904, and an eighth portion 905. Similarly, the first side 1001 of the second cleaning cloth 1000 defines a first portion 1002, a second portion 1003, a third portion 1004, and a fourth portion 1005, while the second side 1101 of the second cleaning cloth 1000 defines a fifth portion 1102, a sixth portion 1103, a seventh portion 1104, and an eighth portion 1105. In one or more embodiments, each portion of the plurality of portions comprises one of the plurality of sequential alphanumeric indicia (207,307,407,607) indicia to indicate the order of using the plurality of portions.

Illustrating by example, in one embodiment the first portion 802 of the first cleaning cloth 800 includes the first visual indicator, e.g., visual indicators 238,(339), while the second portion 803 includes the second visual indicator, e.g., visual indicators 239,(340). Similarly the third portion 804 includes the third visual indicator, e.g., visual indicators 240,(341), while the fourth portion 805 includes the fourth visual indicator, e.g., visual indicators 241,(342). The fifth portion 902 includes the fifth visual indicator (not shown due to the first portion 802 being flipped over) and the sixth portion 903 includes the sixth visual indicator, e.g., visual indicators 245,(344). The seventh portion 904 includes the seventh visual indicator, e.g., visual indicators 246,(345), while the eighth portion 905 includes the eighth visual indicator, e.g., visual indicator 247 (where included).

In one embodiment, the first portion 1002 of the second cleaning cloth 1000 includes the ninth visual indicator, e.g., visual indicators 248,(347), while the second portion 1003 includes the tenth visual indicator, e.g., visual indicators 249,(348). Similarly the third portion 1004 includes the eleventh visual indicator, e.g., visual indicators 250,(349), while the fourth portion 1005 includes the twelfth visual indicator, e.g., visual indicators 251, (350). The fifth portion 1102 includes the thirteenth visual indicator, e.g., visual indicators 252,(351), and the sixth portion 1103 includes the fourteenth visual indicator, e.g., visual indicators 253,(352). The seventh portion 1104 includes the fifteenth visual indicator, e.g., visual indicator 254, while the eighth portion 1105 includes the sixteenth visual indicator (not shown due to the fourth portion 305 being flipped over).

The inclusion of the visual indicators along the portions of the first cleaning cloth 800 and second cleaning cloth 1000, respectively, provides a mnemonic device teaching a user which portion of the cloth should be used to clean a portion of the predefined area shown on the teaching insert. Moreover, using two cleaning cloths 800,1000 with eight portions each, when the first subset of the plurality of sequential numerical indicia set forth on the teaching insert correspond to the bathroom of a hospital room, and the second subset of the plurality of sequential numerical indicia correspond to the patient room of a hospital room, with the first subset and the second subset non-overlapping, and the plurality of sequential numerical indicia comprising the numbers one through sixteen, inclusive, the entire hospital room can be cleaned only using two cleaning cloths 800,1000.

In one or more embodiments, each of the first cleaning cloth 800 and the second cleaning cloth 1000 has dimensions of either twelve by twelve inches or sixteen by sixteen inches. These dimensions, being larger than the ordinary human hand, allow for a "flip and fold" technique where each portion of the cleaning cloths 800,1000 can be used on a particular portion of the hospital room. For example, the first portion 802 of the front side 801 of the first cleaning cloth 800 can be used to clean the bed rails (230) of the hospital room, while the second portion 803 of the front side 801 of the first cleaning cloth 800 can be used to clean the nurse call device (231) when using the teaching insert (200) of FIG. 2 as a guide.

The provision of these portions of the cleaning cloths 800,1000 also serves as another mnemonic indicator that the person cleaning the hospital room should not "wad" or "crumple" the cloths, which can result in portions of the cloth not being used before the cloth becomes contaminated with bacteria. The provision of these portions of the cleaning cloths 800,1000 also serves as another mnemonic indicator that prevents the cross contamination of germs and other microorganisms by providing separate quadrants of separate sides of each cloth that should be used only to clean one item. The implicit practice of "flipping and folding" each cloth in accordance with the visual indicators works to reduce both problems, as well as preventing a person from forgetting which parts of each cleaning cloth 800,1000 have already been used. It further works to prevent improper folding that can cause cross contamination as well. The cleaning cloths 800,1000 of FIGS. 8-11 are simple to use, especially when used in conjunction with any of the teaching inserts (200,300,400,600) described above.

Figure 12:
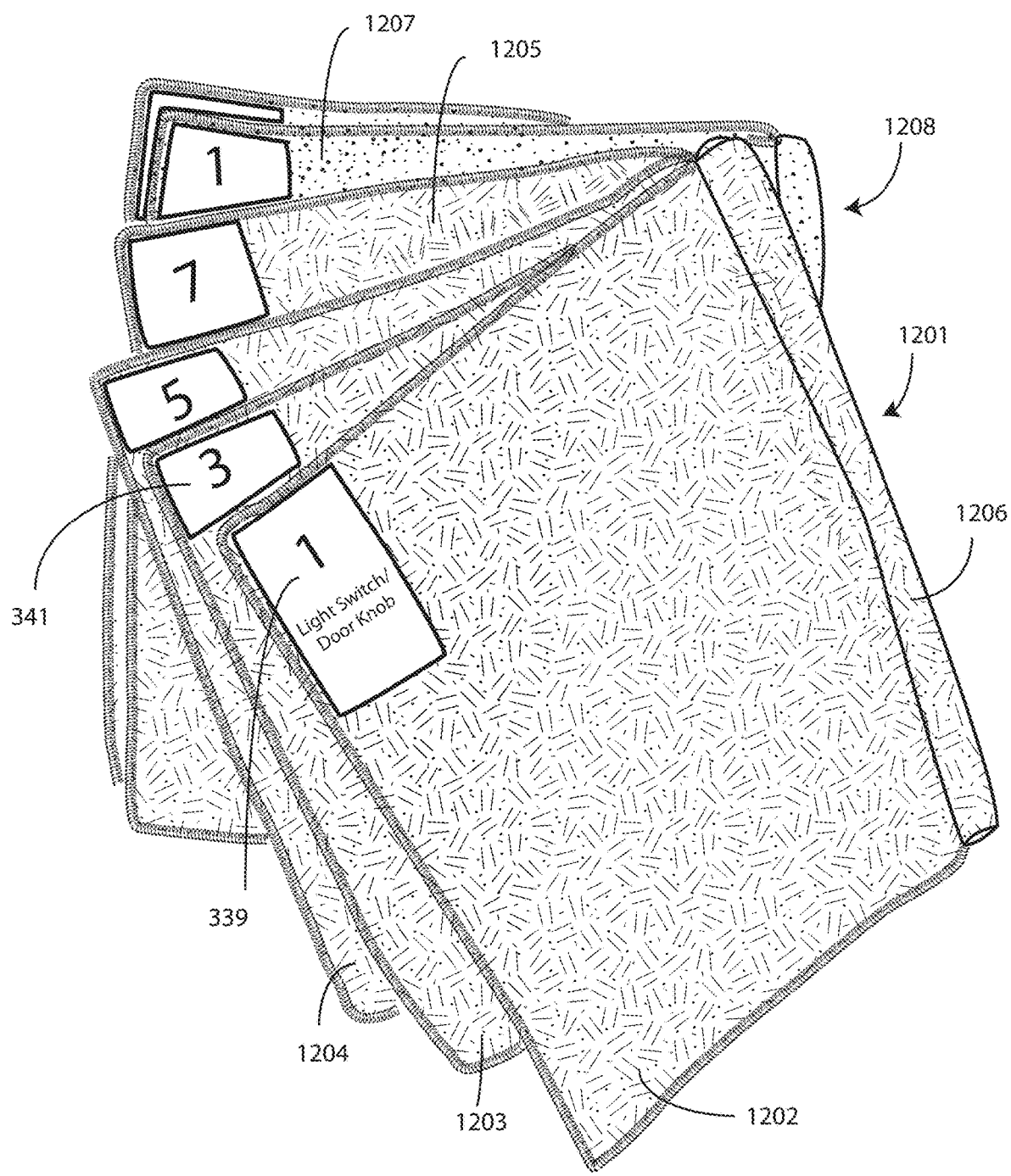
FIG. 12 illustrates explanatory microfiber booklets in accordance with one or more embodiments of the disclosure.

Turning now to FIG. 12, illustrated therein are explanatory microfiber booklets 1201,1208 configured in accordance with one or more embodiment of the disclosure. In this embodiment, rather than having cleaning cloths, one or more microfiber sheets 1202,1203,1204,1205, each manufactured from microfiber textile materials or other similar materials, are joined together at a spine 1206 by stitching or other coupling techniques. Each of these microfiber sheets 1202,1203,1204,1205 can be flipped about the spine 1206 like pages of a book to clean the various portions of a hospital room or other space. In contrast to the cleaning cloths (800,1000) of FIGS. 8-11, where only portions of each cloth were used to clean particular areas, in the embodiment of FIG. 12 entire microfiber sheets 1202,1203, 1204,1205 can be used to clean an area. Thus, using the microfiber booklets 1201,1208 requires less cleaning cloth management in that an entire microfiber sheet 1202,1203, 1204,1205 surface can be used for cleaning a particular item rather than just apportion of a cleaning cloth (800,1000) as previously described.

In one or more embodiments, each microfiber sheet 1202,1203,1204,1205 comprises one of the plurality of sequential numerical indicia, e.g., sequential numerical indicia (207,307), to indicate the order of using each microfiber sheet 1202,1203,1204,205. Illustrating by example, in one embodiment the first microfiber sheet 1202 of the first microfiber booklet 1201 includes the first visual indicator, e.g., visual indicators (238),339, while the reverse side of the first microfiber sheet 1202 includes the second visual indicator, e.g., visual indicators (239),340). Similarly the second microfiber sheet 1203 of the first microfiber booklet 1201 comprises the third visual indicator, e.g., visual indicators (240), 341, and so forth. In one embodiment, the first microfiber sheet 1207 of the second microfiber booklet 1208 can have the eighth visual indicator, e.g., visual indicators (247),346, while the reverse side includes the ninth visual indicator, e.g., visual indicators (248), 347, and so forth.

The inclusion of the visual indicators along the microfiber sheets 1202,1203,1204,1205,1207 of the first microfiber booklet 1201 and second microfiber booklet 1208, respectively, provides a mnemonic device teaching a user which microfiber sheet 1202,1203,1204,1205,1207 should be used to clean a portion of the predefined area shown on the teaching insert. Moreover, using two microfiber booklets 1201,1208 with four sheets each, when the first subset of the plurality of sequential numerical indicia set forth on the teaching insert correspond to the bathroom of a hospital room, and the second subset of the plurality of sequential numerical indicia correspond to the patient room of a hospital room, with the first subset and the second subset overlapping, and the plurality of sequential numerical indicia comprising the numbers one through seven, inclusive, the entire hospital room can be cleaned only using two microfiber booklets.

Figure 13:
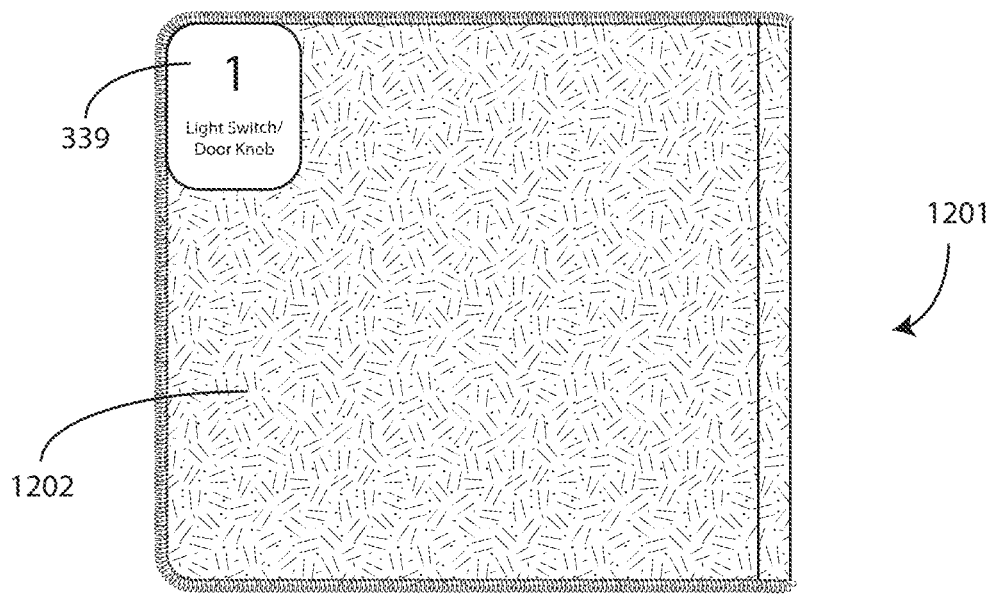
FIG. 13 illustrates one explanatory microfiber booklet in an initial configuration in accordance with one or more embodiments of the disclosure.
Figure 14:
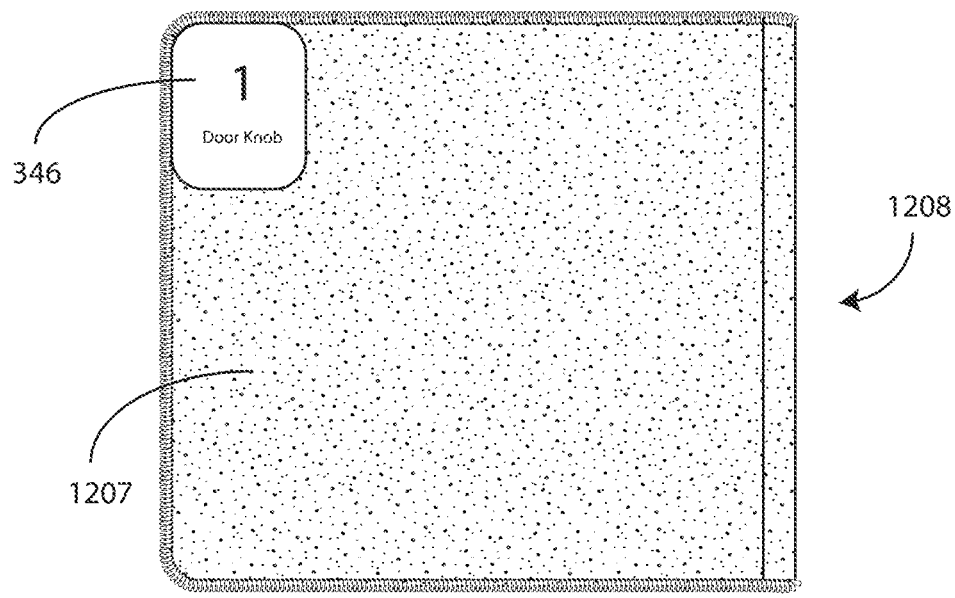
FIG. 14 illustrates another explanatory microfiber booklet in an initial configuration in accordance with one or more embodiments of the disclosure.

Turning now to FIGS. 13 and 14, to use each microfiber booklet 1201,1208, one starts with the outermost microfiber sheet 1202,1207, as indicated by the visual indicators, e.g., visual indicators 339,346. In one embodiment, the microfiber booklets 1201,1208 are color-coded so that one can quickly identify, through the mnemonic device provided by the color-coding, which microfiber booklet 1201,1208 should be used with which room portion.

In one embodiment, for example, microfiber booklet 1201 is green, while microfiber booklet 808 is blue. Recall from above that in one or more embodiments each visual indicator, e.g., visual indicators (339,340,341,342,343,344,345, 356,347,348, 349, 350,351,352), of the teaching insert (300) can be color-coded. In one embodiment the visual indicators, e.g., visual indicators (339,340,341,342,343,344,345), set forth in the additional room matrix (312) each comprise blue squares with white numbers disposed thereon. By color-coding the second microfiber booklet 1208 blue, a user instantly knows that the second microfiber booklet 1208 should be used with the patient room. By contrast, in one embodiment visual indicators, e.g., visual indicators (339, 340,341,342,343, 344,345,356,347,348,349,350,351,352) in the restroom matrix (313), each comprise green squares with numbers disposed thereon. Color-coding the first microfiber booklet 1201 green, a person cleaning the predefined area (306) that is the restroom is able to quickly identify which microfiber booklet 1201 should be used.

Figure 15:
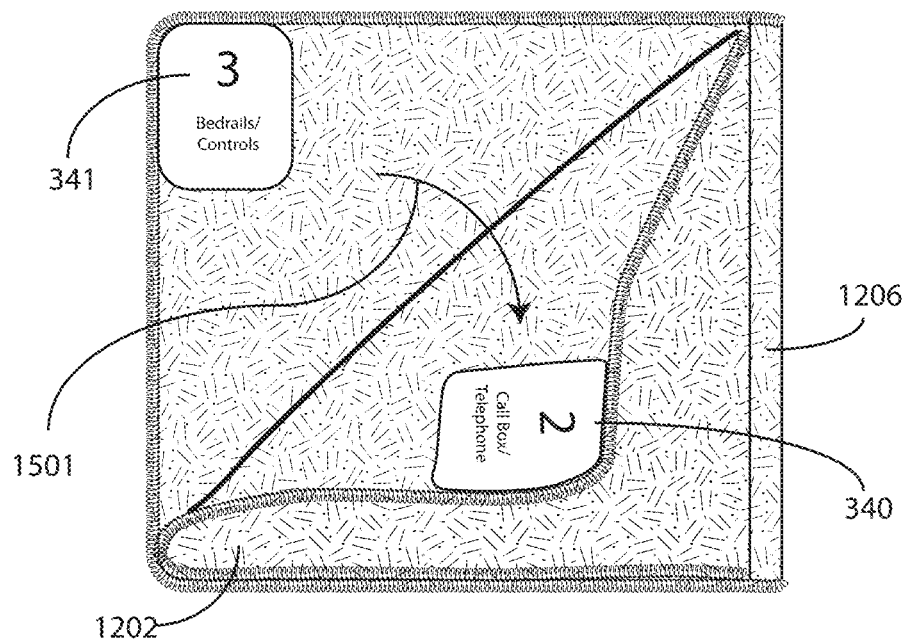
FIG. 15 illustrates one explanatory microfiber booklet with one of the microfiber sheets folded down to expose additional indicia in accordance with one or more embodiments of the disclosure.
Figure 16:
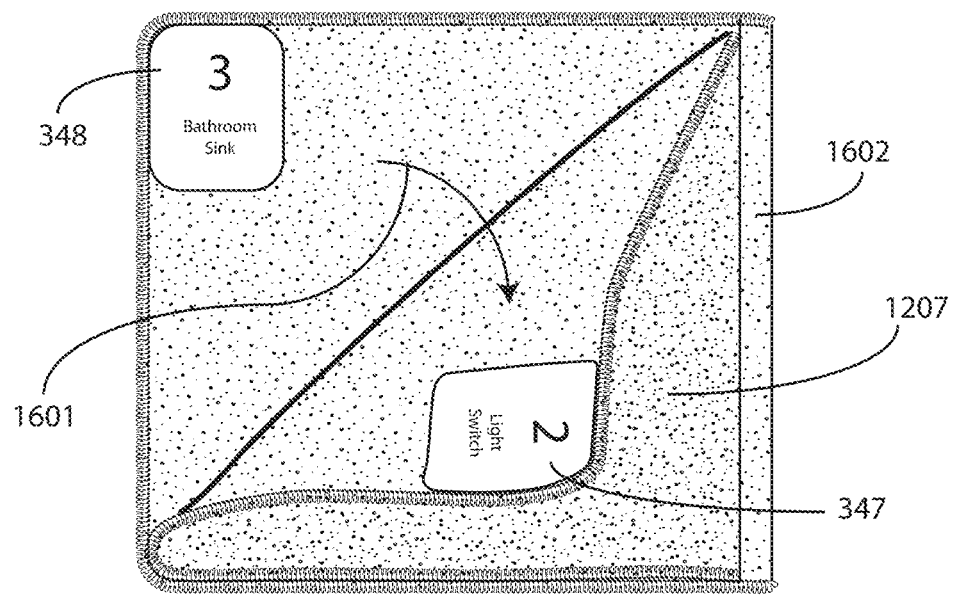
FIG. 16 illustrates another explanatory microfiber booklet with one of the microfiber sheets folded down to expose additional indicia in accordance with one or more embodiments of the disclosure.

Turning now to FIGS. 15-16, once the first portion of each area is cleaned using the outermost microfiber sheet 1202, 1207, it can be folded 1501,1601 about the spine 1206,1602 to reveal additional visual indicators, e.g., visual indicators 340,347 and visual indicators 341,348. Accordingly, remaining surfaces and contact points can be clean in accordance with the chronology of the visual indicators, e.g., visual indicators 340,347,341,348, to ensure that each surface is cleaned in the proper order.

Figure 17:
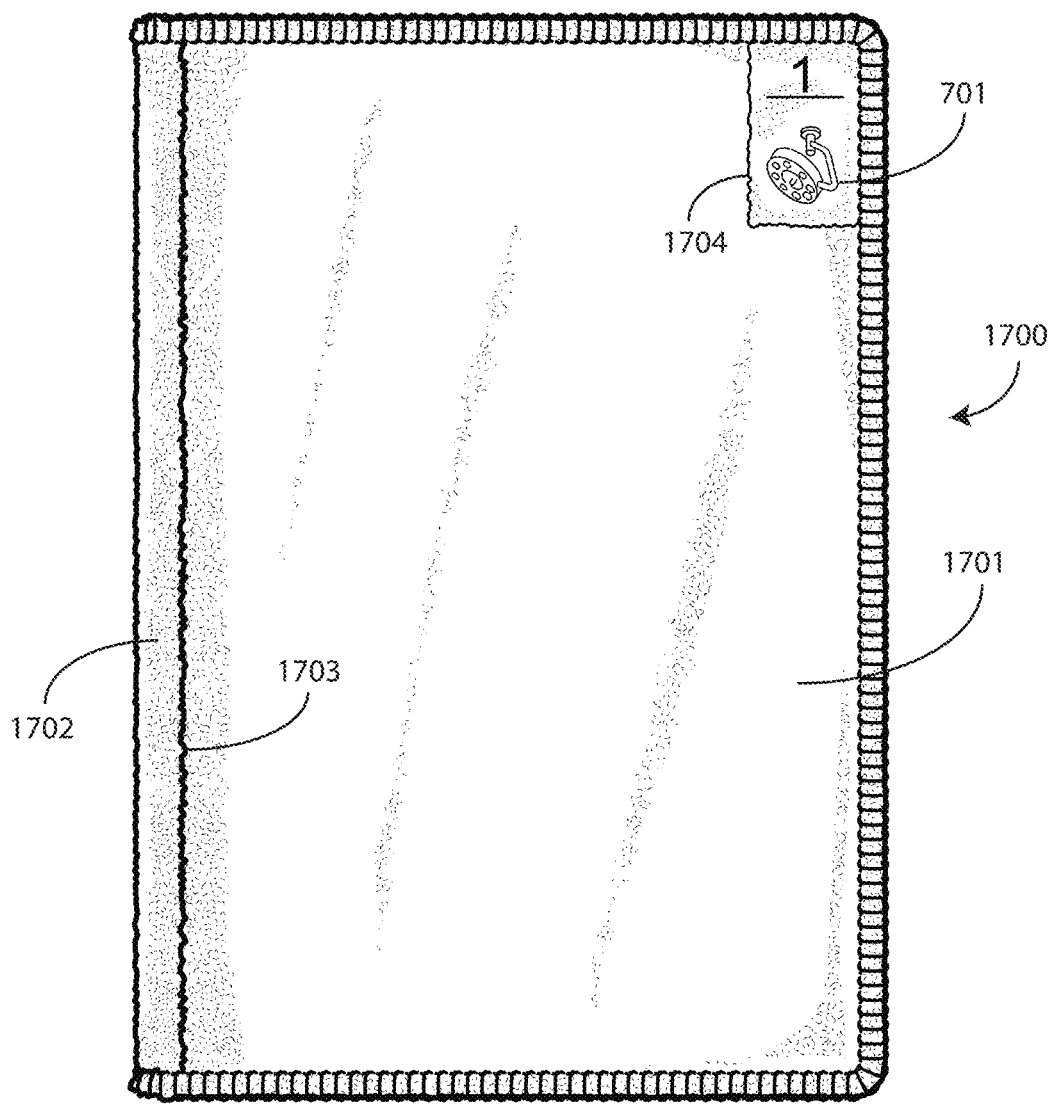
FIG. 17 illustrates another explanatory microfiber booklet in an initial configuration in accordance with one or more embodiments of the disclosure.
Figure 18:
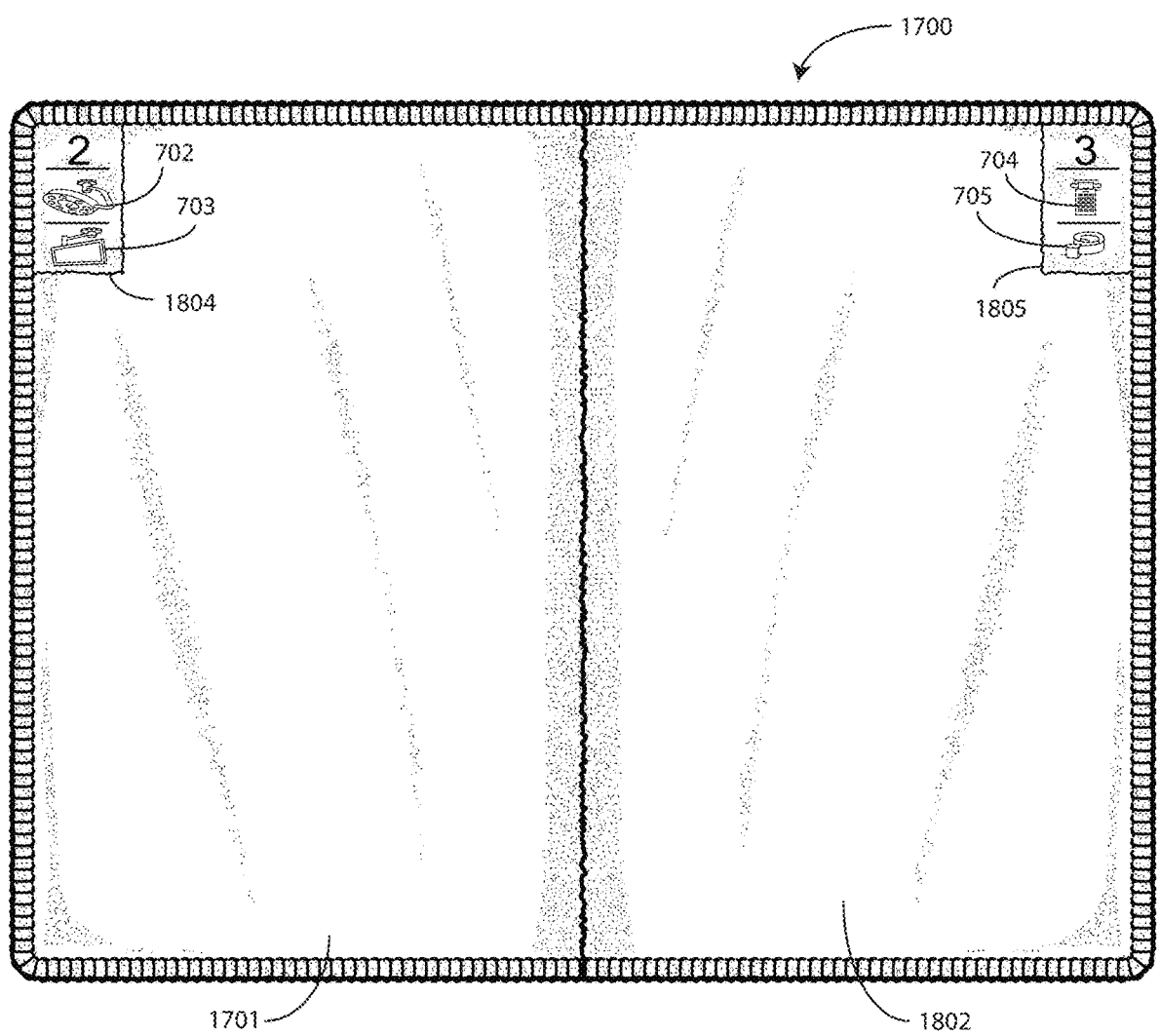
FIG. 18 illustrates an interior view of the explanatory microfiber booklet of FIG. 17, with one of the microfiber sheets opened to expose additional indicia in accordance with one or more embodiments of the disclosure.
Figure 19:
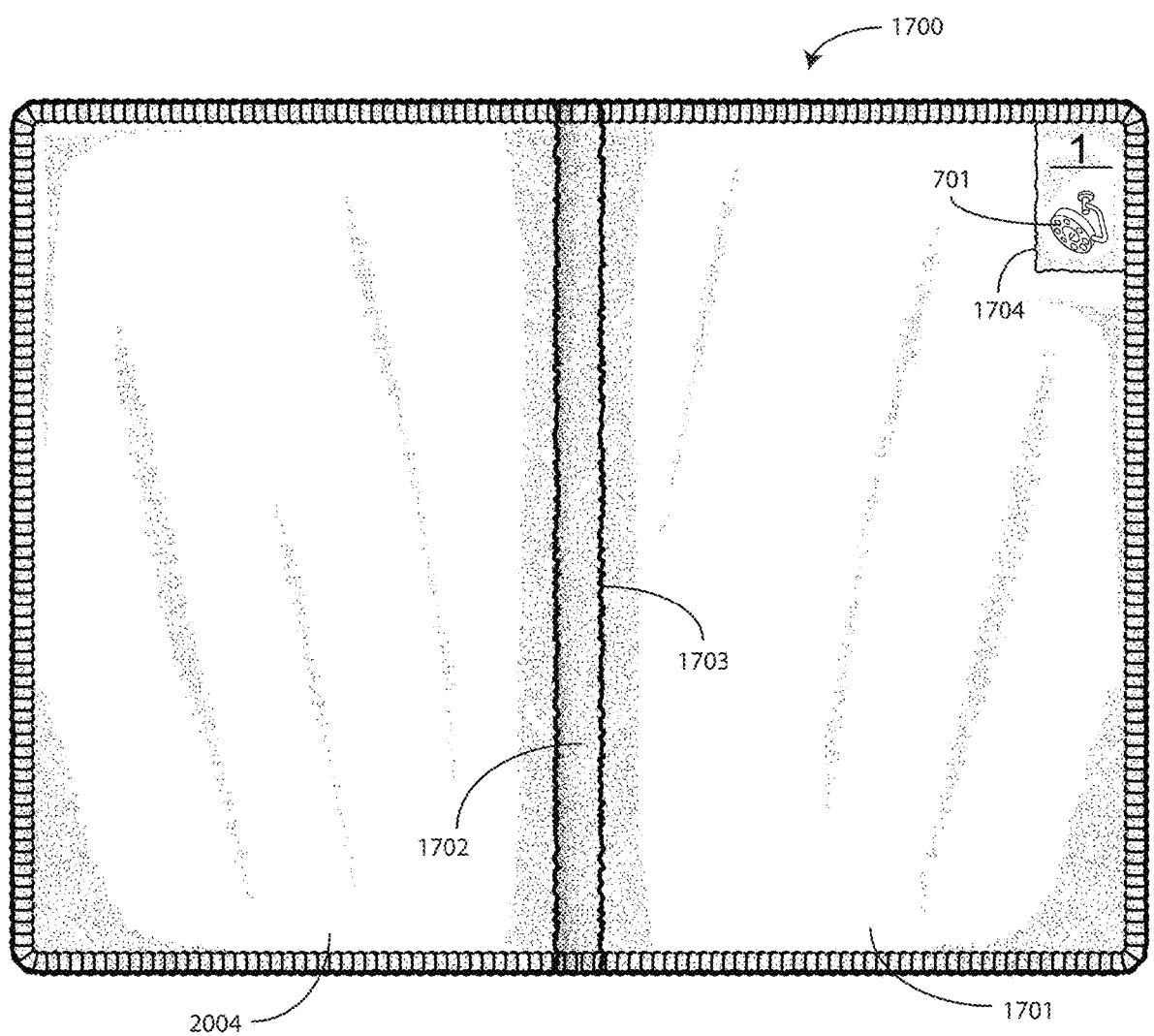
FIG. 19 illustrates an exterior view the explanatory microfiber booklet of FIG. 17, with one of the microfiber sheets opened in accordance with one or more embodiments of the disclosure.

Turning now to FIGS. 17-20, illustrated therein is an alternate microfiber booklet 1700 configured in accordance with one or more embodiments of the disclosure. FIG. 17 illustrates a front elevation view of the microfiber booklet 1700 when closed, while FIG. 21 illustrates a perspective view of the microfiber booklet 1700 when closed. FIG. 18 illustrates a front elevation view of the microfiber booklet 1700 when folded to an open position between a first microfiber sheet 1701 and a second microfiber sheet 1802. FIG. 19 then illustrates a rear elevation view of the microfiber booklet when folded to an open position between the second microfiber sheet (1802) and a third microfiber sheet (2003).

Figure 20:
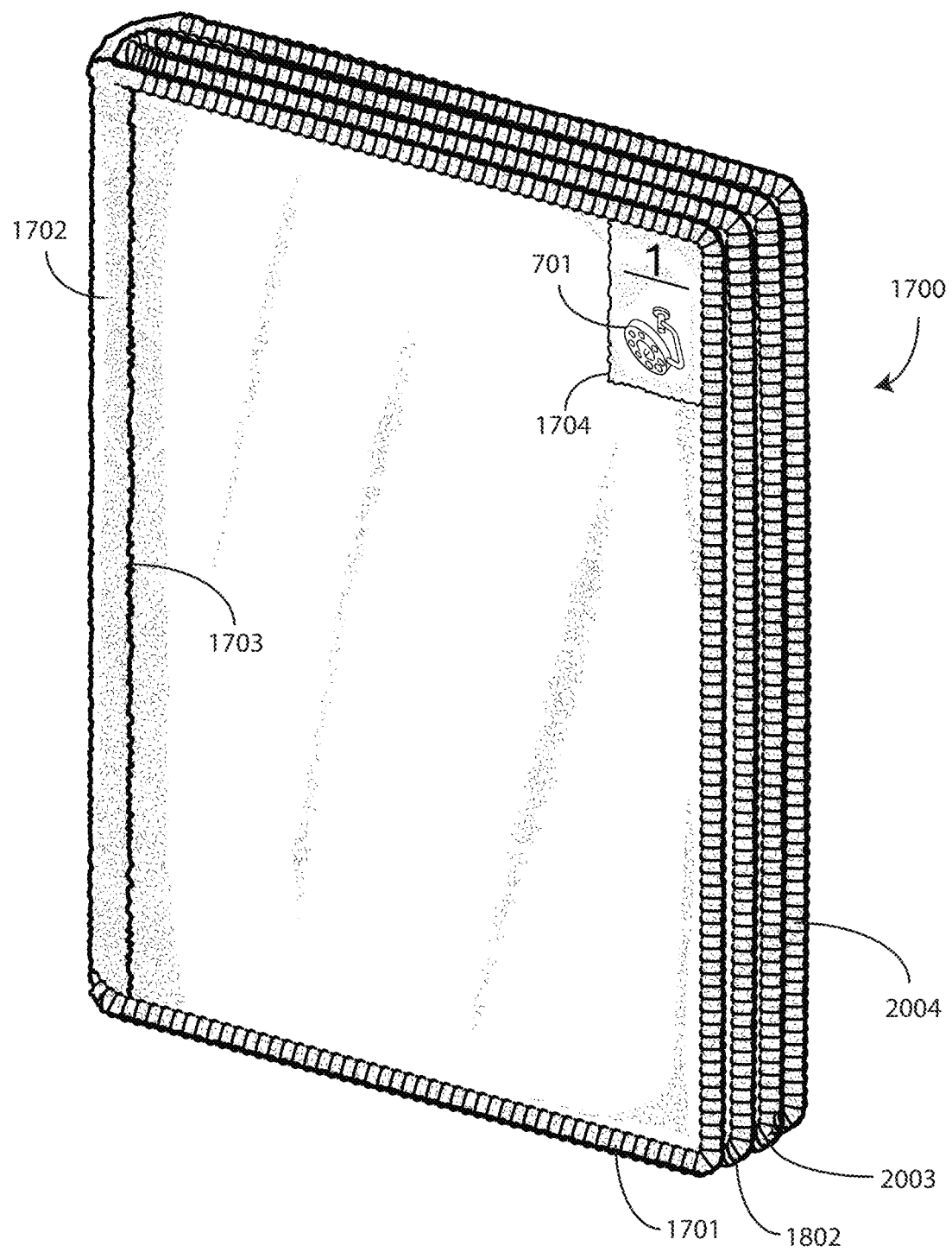
FIG. 20 illustrates a perspective view of the explanatory microfiber booklet of FIG. 17.

In one or more embodiments, the one or more microfiber sheets are manufactured from microfiber textile materials or other similar materials. In one or more embodiments, the one or more microfiber sheets and are joined together at a spine 1702 by stitching along a seam 1703 or other coupling techniques. As best shown in FIG. 20, in this illustrative embodiment the microfiber booklet 1700 comprises four microfiber sheets: a first microfiber sheet 1701, a second microfiber sheet 1802, a third microfiber sheet 2003, and a fourth microfiber sheet 2004. In other embodiments, the microfiber booklet 1700 can have fewer than, or more than, four microfiber sheets. Other configurations for the microfiber booklet 1700 will be obvious to those of ordinary skill in the art having the benefit of this disclosure.

In one or more embodiments, each microfiber sheet 1701,1802,2003,2004 comprises at least one badge 1704. In this illustrative example, each microfiber sheet 1701,1802, 2003 other than the fourth microfiber sheet 2004 includes two badges. Using the first microfiber sheet 1701 as an illustrative example, a first badge 1704 is placed on a first major face of the first microfiber sheet 1701, while a second badge 1804 is placed on a second major face of the first microfiber sheet. In this illustrative embodiment, the first badge 1704 is placed on a first major face of the first microfiber sheet 1701 at an upper right hand corner of the first microfiber sheet 1701, while a second badge 1804 is placed on a second major face of the first microfiber sheet 1701 in the exact same corner, which is the upper left hand corner as shown in FIG. 18. Other configurations for the badges will be obvious to those of ordinary skill in the art having the benefit of this disclosure.

In one or more embodiments, since there are four microfiber sheets 1701,1802,2003,2004, there are a total of eight major faces within the microfiber booklet 1700. Recall from above that, when using the teaching inserts (400,600) of FIGS. 4 and 6, each of the matrices (412,413,612,613) included a series of alphanumeric indicia combined with graphical illustrations, which were shown both on the front side of the teaching inserts (400,600) and, in more detail, on the rear sides (500,700) of the teaching inserts (400,600).

In one or more embodiments, the badges coupled to the microfiber sheets 1701,1802,2003,2004 include the exact same information, namely, the alphanumeric indicia and the graphical illustrations. Illustrating by example, the microfiber booklet 1700 of FIGS. 17-20 corresponds to the second functional area matrix (612) of the teaching insert (600) of FIG. 6. Accordingly, the badges comprise the alphanumeric indicia (607) and the graphical illustrations (701-709) from the second functional area matrix (612) in this example.

For instance, since, in the second functional area matrix (612), the operating room light (630) corresponds to the number one, in this example the first major face of the first microfiber sheet 1701 comprises a badge 1704 comprising the first graphical illustration 701, placed under the number "1," which depicts an operating room light. Since, in the second functional area matrix (612), the other operating lights and/or monitors (631) correspond to the number two, in this example the second major face of the first microfiber sheet 1701 comprises a badge 1804 comprising the second graphical illustration 702 and the third graphical illustration 703, placed under the number "2," which depict another operating light and a monitor, respectively. Since, in the second functional area matrix (612), the arms of a table, a bed, and body straps (632) correspond to the number three, in this example the first major face of the second microfiber sheet 1802 comprises a badge 1805 comprising a fourth graphical illustration 704 and a fifth graphical illustration 705, placed under the number "3," which depict arms of a table, a bed, and body straps.

The badges on the microfiber sheets 1701,1802,2003, 2004 can accordingly be configured with any of the alphanumeric indicia/graphical illustration combinations shown in FIGS. 5 and 7 to correspond with the matrices of the teaching inserts (400,600) of FIGS. 4-6. These different configurations will be described below, but are illustrated in four commonly assigned US Design Applications, each of which is entitled "Microfiber Booklet."

Since, in the second functional area matrix (612), the operating room mattress (633) corresponds to the number four, the second major face of the second microfiber sheet 1802 can include a badge comprising the sixth graphical illustration (706), placed under the alphanumeric indicator "4a," which depicts a mattress. Similarly, the first major face of the third microfiber sheet 2003 can include a badge comprising the seventh graphical illustration (707), placed under the alphanumeric indicator "4b," which also depicts a mattress. Since, in the second functional area matrix (612), the operating room table (634) corresponds to substep "5a" and substep "5b," the second major face of the third microfiber sheet 2003 can include the eighth graphical illustration (708), placed under the alphanumeric indicator "5A," which depict an operating table. The first major face of the fourth microfiber sheet 2004 can then include the ninth graphical illustration (709), placed under the alphanumeric indicator "5B," which depicts the operating table. The second major face of the fourth microfiber sheet 2004 can then optionally include no badge, as shown in FIG. 19.

In another embodiment, the microfiber booklet 1700 can be configured with badges corresponding to the portions of the anesthesia area illustrated in FIGS. 6-7. Since, in the first functional area matrix (613), the monitor (622) and corresponding ventilator, buttons, and controls correspond to the number one, the first major face of the first microfiber sheet 1701 can comprise a badge 1704 comprising the tenth graphical illustration (710), placed under the number "1," which depicts a monitor. Since, in the first functional area matrix (613), the vaporizer and flow meter (623) corresponds to the number two, the second major face of the first microfiber sheet 1701 can comprise a badge 1804 comprising the eleventh graphical illustration (711), placed under the number "2," which depicts a vaporizer and flow meter.

Since, in the first functional area matrix (613), the soda lime and scavenging system (624) corresponds to the number three, the first major face of the second microfiber sheet 1802 can comprise a badge 1805 comprising the twelfth graphical illustration (712), placed under the number "3," which depicts a soda lime and scavenging system. Since, in the first functional area matrix (613), the tray and shelves on an anesthesia machine (625) correspond to the number four, the second major face of the second microfiber sheet 1802 can comprise a badge comprising the thirteenth graphical illustration (713), placed under the number "4," which depicts an anesthesia machine, with arrows pointing to the tray and shelves.

Since, in the first functional area matrix (613), the anesthesia cart (626) corresponds to the number five, the first major face of the third microfiber sheet 2003 can comprise a badge comprising the fourteenth graphical illustration (714), placed under the alphanumeric indicator "5a," which depicts an anesthesia cart. Similarly, the second major face of the third microfiber sheet 2003 can comprise a badge comprising the fifteenth graphical illustration 715, placed under the alphanumeric indicator "5b," also depicting the anesthesia cart. Since, in the first functional area matrix (613), the intravenous fluid pole (627) corresponds to the number six, the first major face of the fourth microfiber sheet 2004 can comprise a badge comprising the sixteenth graphical illustration (716), placed under the number "6," depicting an intravenous fluid pole. The second major face of the fourth microfiber sheet 2004 can then optionally include no badge, as shown in FIG. 19.

In still another embodiment, the microfiber booklet 1700 can be configured with badges corresponding to the portions of the restroom illustrated in FIGS. 4-5. Since, in the additional room matrix (412), where the light switch (430) and room inner doorknob (431) correspond to the number one, the first major face of the first microfiber sheet 1701 can comprise a badge 1704 comprising the first graphical illustration (501), placed under the number "1," which depicts a doorknob, while a second graphical illustration (502), also on the badge 1704, depicts a light switch. Since, in the additional room matrix (412), the handles and of a bedside table (432) and the phone (433) correspond to the number two, the second major face of the first microfiber sheet 1701 can comprise a badge 1804 comprising the third graphical (503), placed under the number "2," which depict a bedside table with an arrow pointing to the handles, while a fourth graphical illustration (504), also on the badge 1804, depicts a phone.

Since, in the additional room matrix (412), the call box button (434) corresponds to the number three, the first major face of the second microfiber sheet 1802 can comprise a badge 1805 comprising the fifth graphical illustration (505), placed under the number "3," which depicts a call button. Since, in the additional room matrix (412), the tray table (435) corresponds to the number four, the second major face of the second microfiber sheet 1802 can comprise a badge comprising the sixth graphical illustration (506), placed under the number "4," which depicts a tray table.

Since, in the additional room matrix (412), the left bedside rails (436) correspond to substep "5a," the first major face of the third microfiber sheet 2003 can comprise a badge comprising the seventh graphical illustration (507), placed under the alphanumeric indicator "5A," which depict beside rails. Since, in the additional room matrix (412), the right bedside rails (437) correspond to substep "5b," the second major face of the third microfiber sheet 2003 can comprise a badge comprising the eighth graphical illustration (508), placed under the alphanumeric indicator "5B," which depicts bedside rails as well. Alternatively, the first major face of the third microfiber sheet 2003 can include a badge for both the left bedside rails (436) and the right bedside rails (437), with the seventh graphical illustration (507), placed under the number "5," which depict bedside rails.

Since, in the additional room matrix (412), the chair (438) corresponds to substep "6a," the second major face of the third microfiber sheet 2003 can comprise a badge comprising the ninth graphical illustration (509), placed under the alphanumeric indicator "6A," which depicts a chair. Since, in the additional room matrix (412), the other chair (439) corresponds to substep "6b," the first major face of the fourth microfiber sheet 2004 can comprise a badge comprising the a tenth graphical illustration (510), placed under the alphanumeric indicator "6B," which also depicts a chair. Since, in the additional room matrix (412), the room sink (440) corresponds to the number seven, the second major face of the fourth microfiber sheet 2004 can comprise a badge comprising the an eleventh graphical illustration (511), placed under the number "7," which depicts a sink.

In still another embodiment, the microfiber booklet 1700 can be configured with badges corresponding to the portions of the patient illustrated in FIGS. 4-5. Since, in the restroom matrix (413), the bathroom inner doorknob (422) and the bathroom light switch (423) correspond to the number one, the first major face of the first microfiber sheet 1701 can comprise a badge 1704 comprising the twelfth graphical illustration (512), placed under the number "1," along with the thirteenth graphical illustration (513), similarly placed, which depict a doorknob and a light switch, respectively. Since, in the restroom matrix (413), the bathroom sink (424) corresponds to the number two, the second major face of the first microfiber sheet 1701 can comprise a badge 1804 comprising the fourteenth graphical illustration (514), placed under the number "2," which depicts a sink.

Since, in the restroom matrix (413), the bathroom handrail on the wall (425) corresponds to the number three, the first major face of the second microfiber sheet 1802 can comprise a badge 1805 comprising the fifteenth graphical illustration (515), placed under the number "3," which depicts a handrail. Since, in the restroom matrix (413), the bathroom handrail by the toilet (426) corresponds to the number four, the second major face of the second microfiber sheet 1802 can comprise a badge comprising the sixteenth graphical illustration (516), placed under the number "4," which depicts a handrail.

Since, in the restroom matrix (413), the toilet bedpan cleaner (427) corresponds to the number five, the first major face of the third microfiber sheet 2003 can comprise a badge comprising the seventeenth graphical illustration (517), placed under the number "5," which depicts a toilet bedpan cleaner. Since, in the restroom matrix (413), the toilet flush handle 428 corresponds to the number six, the second major face of the third microfiber sheet 2003 can comprise a badge comprising the eighteenth graphical illustration (518), placed under the number "6," which depicts a toilet flush handle.

Since, in the restroom matrix (413), the toilet seat (429) corresponds to the number seven, the first major face of the fourth microfiber sheet 2004 can comprise a badge comprising the nineteenth graphical illustration (519), placed under the number "7," which depicts a toilet seat. The second major face of the fourth microfiber sheet 2004 can then optionally include no badge, as shown in FIG. 19.

Each of these microfiber sheets 1701,1802,2003,2004 can be flipped about the spine 1702 like pages of a book to clean the various portions of a hospital room, operating room, or other space. In contrast to the cleaning cloths (800,1000) of FIGS. 8-11, where only portions of each cloth were used to clean particular areas, in the embodiment of FIGS. 17-20 entire microfiber sheets 1701,1802,2003,2004 can be used to clean an area. Thus, using the microfiber booklet 1700 requires less cleaning cloth management in that an entire microfiber sheet 1701,1802,2003,2004 surface can be used for cleaning a particular item rather than just apportion of a cleaning cloth (800,1000) as previously described. The microfiber booklet 1700 can be used in the same manner as that described above with reference to FIGS. 12-16, but with the teaching inserts (400,600) of FIGS. 4-7.

Figure 21:
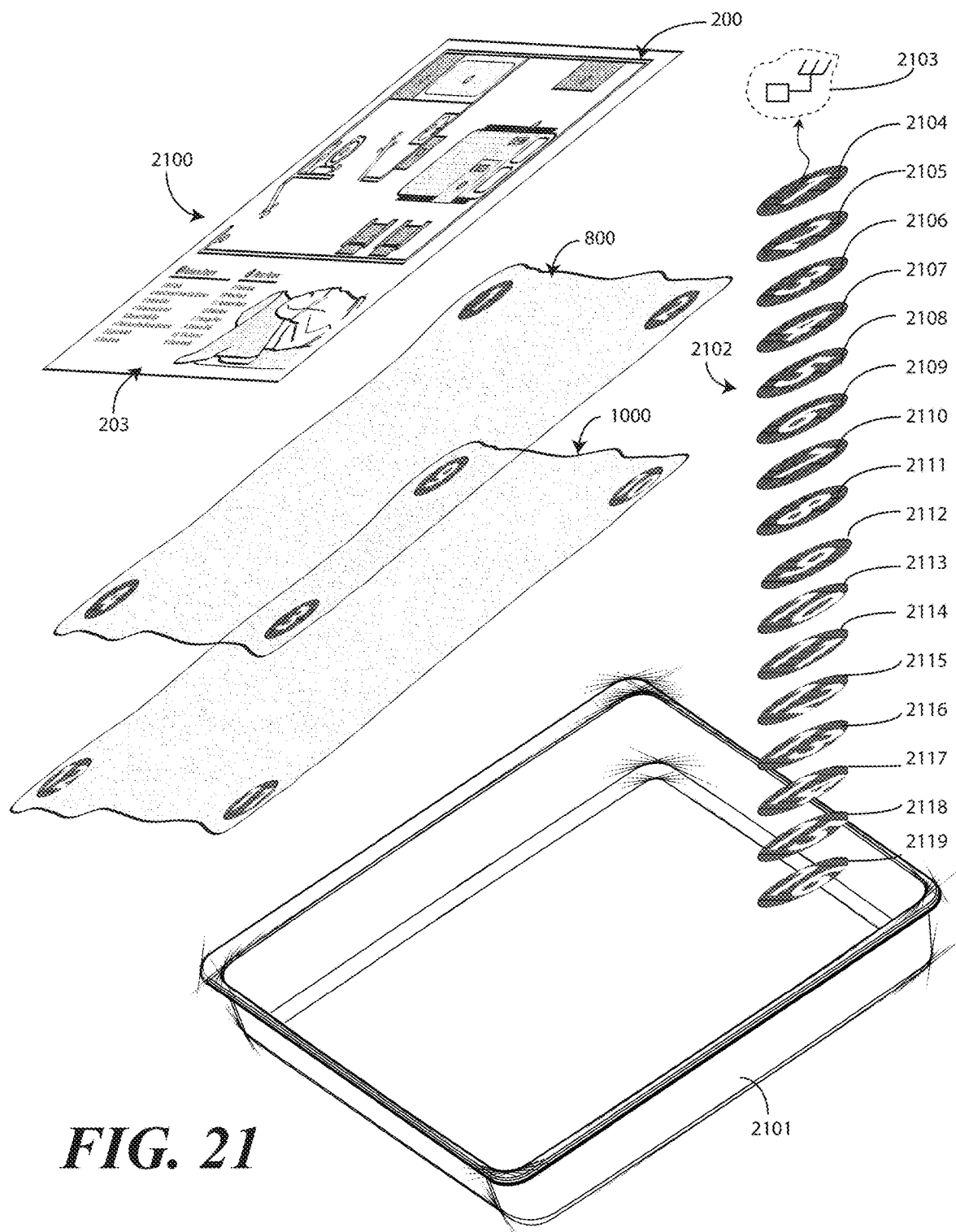
FIG. 21 illustrates one explanatory cleaning package assembly in accordance with one or more embodiments of the disclosure.

Turning now to FIG. 21, illustrated therein is one explanatory cleaning package assembly 2100 configured in accordance with one or more embodiments of the disclosure. The explanatory cleaning package assembly 2100 of FIG. 21 is shown in an exploded perspective view for ease of illustration.

As shown in FIG. 21, the cleaning package assembly 2100 includes a package 2101. The cleaning package assembly 2100 can include one or more cleaning cloths disposed within the package 2101 in one embodiment. In another embodiment, the cleaning package assembly 2100 will include one or more microfiber booklets disposed within the package 2101. In the illustrative embodiment of FIG. 21, the cleaning cloths comprise the first cleaning cloth 800 and the second cleaning cloth 1000 of FIGS. 8-11 above. However, it should be understood that the first microfiber booklet (1201) and the second microfiber booklet (1208) could be substituted for the first cleaning cloth 800 and second cleaning cloth 1000 to form another cleaning package assembly. In another configuration, the four embodiments of the microfiber booklet (1700) of FIGS. 17-21 could be included in the cleaning package assembly 2100. Moreover, combinations of cleaning cloths, such as those shown in FIGS. 8-11, and microfiber booklets, such as those shown above in FIG. 8-12 or 17-20, could be included as well. Other configurations for the cleaning package assembly 2100 will be obvious to those of ordinary skill in the art having the benefit of this disclosure.

In one or more embodiments, the cleaning package assembly 2100 also includes an instructional insert. Here, the instructional insert is the teaching insert 200 of FIG. 2. However, the instructional insert could also be the teaching insert (300) of FIG. 3 in another embodiment. In another embodiment, the instructional insert could be the teaching insert (400) of FIGS. 4-5. In still another embodiment, the instructional insert could be the teaching insert (600) of FIGS. 6-7. Regardless of which teaching insert 200,(300, 400,600) is included, in one or more embodiments it is disposed within the package 2101 with the one or more cleaning cloths 800,1000 and/or microfiber booklets (1201, 1208,1700), and serves to instruct an order of using the portions of each cleaning cloth or microfiber booklet as previously described.

In one or more embodiments, the cleaning package assembly 2100 further includes a plurality of markers 2102. While sixteen markers are shown in FIG. 21, which corresponds to the teaching insert 200 of FIG. 2, other numbers could be used. For instance, where the teaching insert (300) is that of FIG. 3, fourteen markers may be included. Where the teaching insert (400) of FIGS. 4-5 is used nineteen markers may be included. Where the teaching insert (600) of FIGS. 6-7 is used, thirteen markers may be included. Other numbers of markers will be obvious to those of ordinary skill in the art having the benefit of this disclosure. The plurality of markers 2102 can be placed on various items within a predefined area, such as a hospital room, operating room, or other area. The plurality of markers 2102 can take any of a variety of forms. In one embodiment, each marker comprises a sticker that can be adhesively attached to the items in a hospital room, and in particular, the items listed in the legend portion of the instruction insert.

In one embodiment, each marker is color coded as well. For example, in one embodiment markers 2104,2105,2106, 2107,2108,2109,2110,2111 each comprise blue circles with white numbers disposed thereon. In another embodiment, markers 2104,2105,2106,2107,2108,2109, 2110,2111 each comprise blue squares with white numbers disposed thereon. The numbers correspond to the plurality of sequential numerical indicia set forth in the legend portion 203 of the teaching insert 200, or alternatively with the plurality of sequential numerical indicia set forth in the legend portion (303) of teaching insert (300).

Similarly, markers 2112,2113,2114,2115,2116,2117,2118, 2119 can each comprise red circles or green circles with white numbers disposed thereon. In one embodiment, markers 2112,2113,2114,2115,2116,2117,2118,2119 can each comprise green squares with white numbers disposed thereon. This color-coding allows a person cleaning the predefined area to quickly identify which portions of the predefined area are to be cleaned first and which are to be cleaned second.

In one embodiment, each marker comprises a Radio Frequency Identification (RFID) circuit 2103. The RFID circuit 2103 can include a transmission antenna to transmit to RFID readers so that a person cleaning can simply walk past a particular marker and identify its sequence within the sequential numerical indicia quickly and efficiently. In one embodiment, each RFID circuit 2103 includes a control device coupled to an oscillation frequency component. The oscillation frequency component can be an impedance component used in conjunction with an RC timing circuit, or alternatively may be an inductance component that works to determine a transmission frequency in an LC circuit. Alternatively, it can be a capacitive device.

RFID devices are but one technology that can be included with each marker. In another embodiment, each marker includes a motion detector or other sensor that triggers and records data when someone is close to it. Accordingly, a supervisor can quickly identify which portions of the predefined area were cleaned, when they were cleaned, and by whom. Other technologies that can be incorporated into the markers will be obvious to those of ordinary skill in the art having the benefit of this disclosure.

As shown in FIG. 21, each marker can comprise one of the plurality of sequential numerical indicia (207,307) shown on the instruction insert. When these markers are placed on items in a hospital room, a person can use the instruction insert and the cleaning cloths to quickly and efficiently clean the hospital room with little or no training whatsoever.

Figure 22:
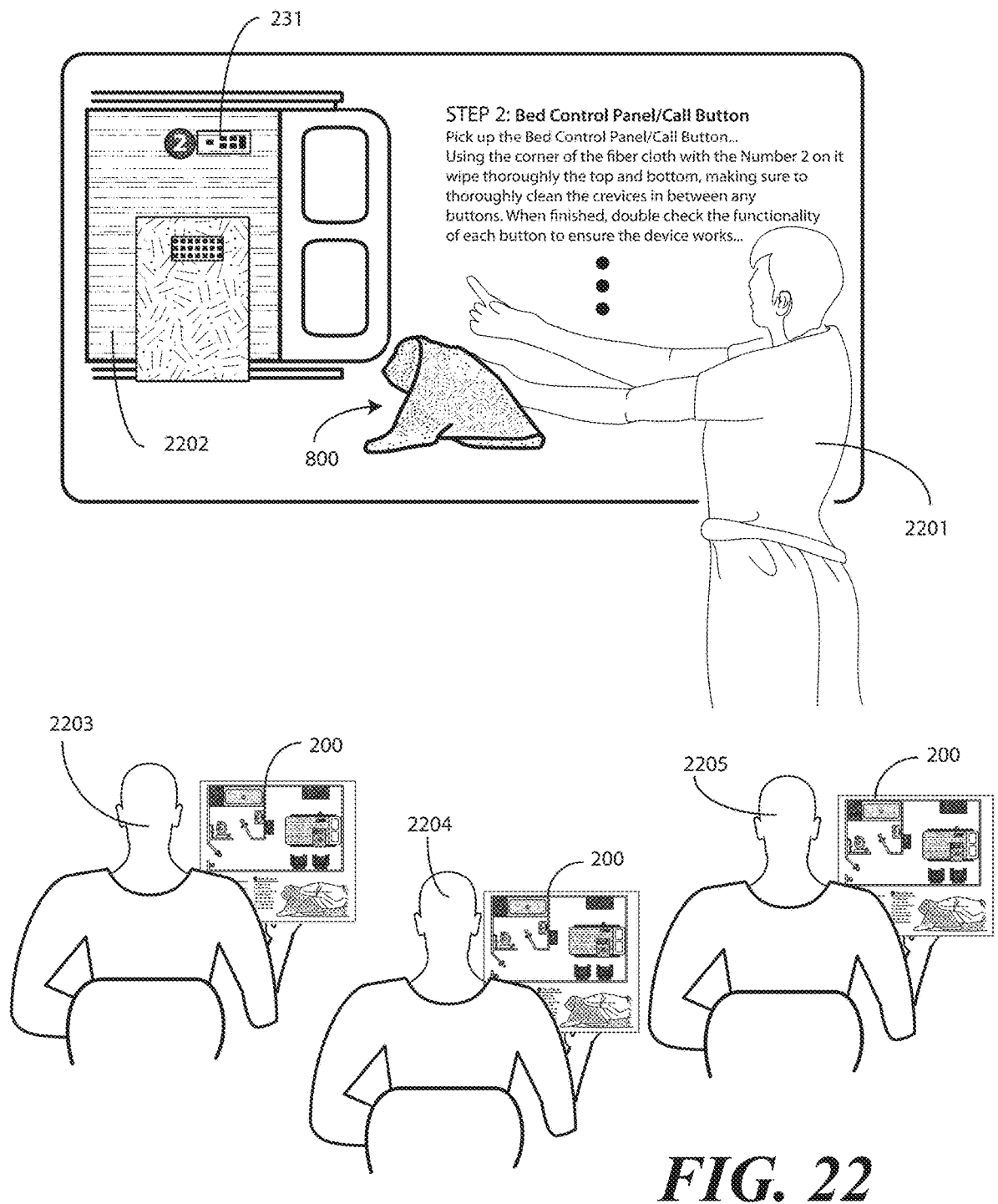
FIG. 22 illustrates an explanatory method in accordance with one or more embodiments of the disclosure.

It should be noted that inclusion of the teaching insert (200,300) with a cleaning package assembly 2100 is but one way of using a visual teaching aid (100) configured in accordance with one or more embodiments of the disclosure. Turning now to FIG. 22, illustrated therein is another embodiment. Still other embodiments will be obvious to those of ordinary skill in the art having the benefit of this disclosure.

As shown in FIG. 22, an instructor 2201 is demonstrating how to use a cleaning cloth 800 (or alternatively a microfiber booklet (1201) or microfiber booklet (1700)) to clean nurse call device 231 in a hospital room. Embodiments of the disclosure advantageously allow the presentation of portions of the teaching insert (200,300,400,600), e.g., the hospital bed 2202 in this illustration, on visible media, such as a flat substrate or electronic device. Subsequently, the instructor 2201 can scroll through other portions of the teaching insert (200,300) to discuss cleaning of other items.

In this embodiment, each student 2203,2204,2205 has been given the teaching insert 200,(300,400,600) from FIG. 2 (or FIGS. 3-7). Accordingly, as the instructor 2201 discusses the portion of a predefined area to be cleaned, as that portion is being presented on the wall, and as the instructor 2201 manipulates the cleaning cloth 1200 (or alternatively a microfiber booklet (1201) or microfiber booklet (1700)) to demonstrate the proper flip and fold technique, each student 2203,2204,2205 has pictorial images on a compact, easy to carry and store, teaching insert 200,(300,400,600). Each student 2203,2204,2205 can then follow along on their teaching insert 200,(300,400,600) while the instructor 2201 teaches a cleaning order for a predefine area. The instructor 2201 can also discuss the application of a plurality of markers (2102) to objects as they are being discussed as well.

Figure 23:
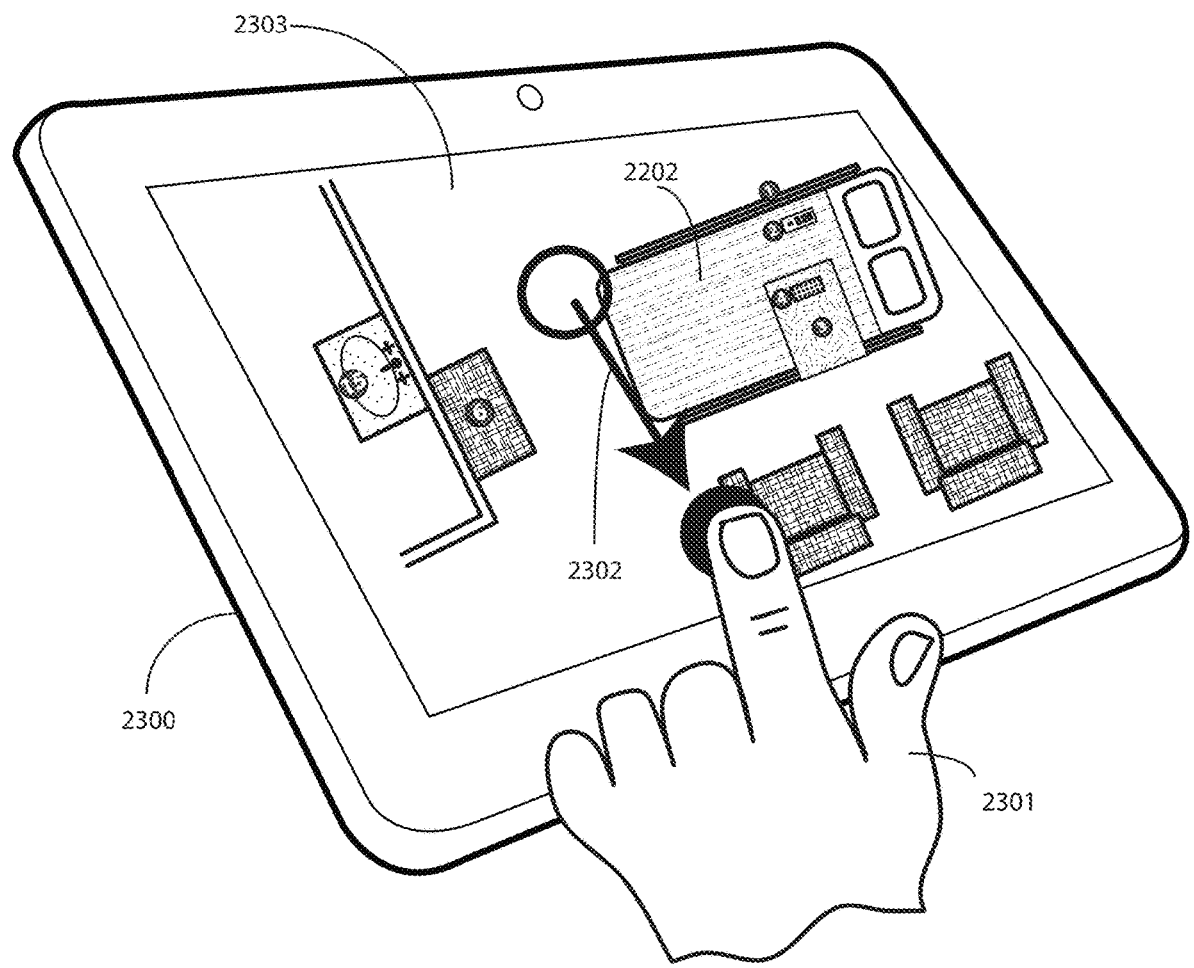
FIG. 23 illustrates yet another explanatory embodiment of a teaching aid in accordance with one or more embodiments of the disclosure.

In yet another embodiment the presentation can be on the display of an electronic device, as shown in FIG. 23. Turning briefly to FIG. 23, a user 2301 is manipulating 2302 the touch-sensitive display 2303 of an electronic device 2300. The teaching insert 200 of FIG. 2 (which could also be the teaching inserts (300,400,600) of FIGS. 3-7) is being presented on the display 2303 of the electronic device 2300. The user 301 can accordingly scroll through the teaching insert 200 at their leisure.

In one or more embodiments, the user 2301 can actuate a user actuation target to cause an education module operable in the electronic device 2300 to present the teaching insert 200. The user 2301 may also be able to interact with presentations objects to be cleaned. For example, the user 2301 may be able to click on an item such as the hospital bed 2302 to watch items associated therewith being cleaned with the first cleaning cloth (1200) (or alternatively a microfiber booklet (1201) or microfiber booklet (1700)) using the proper flip and fold technique. Additionally, the user 2301 may be able to select an item to cause an interactive multi-dimensional rendering to appear on the display 2303.

Examples of the electronic device 2300 include iPod®, iPhone®, or iPad® devices manufactured by Apple Inc., of Cupertino, Calif., cellular telephones or messaging devices such as the Blackberry® manufactured by Research in Motion, Inc., pocket-sized personal computers such as an iPAQ® Pocket PC available by Hewlett Packard Inc., palmtop and tablet style computers running the Android® operating system, such as those manufactured by HTC, Inc., and Motorola, Inc., or any of the other various personal digital assistants, desktop computers, laptop computers, or other electronic devices.

In one or more embodiments, the teaching insert 200, (300,400,600) can be configured as a downloadable application or "app" suitable for execution on the electronic device 2300. The teaching insert 200,(300,400,600) can be configured as stand-alone software, suitable for storage in any of a number of computer readable media for execution by any number of processing devices.

Figure 24:
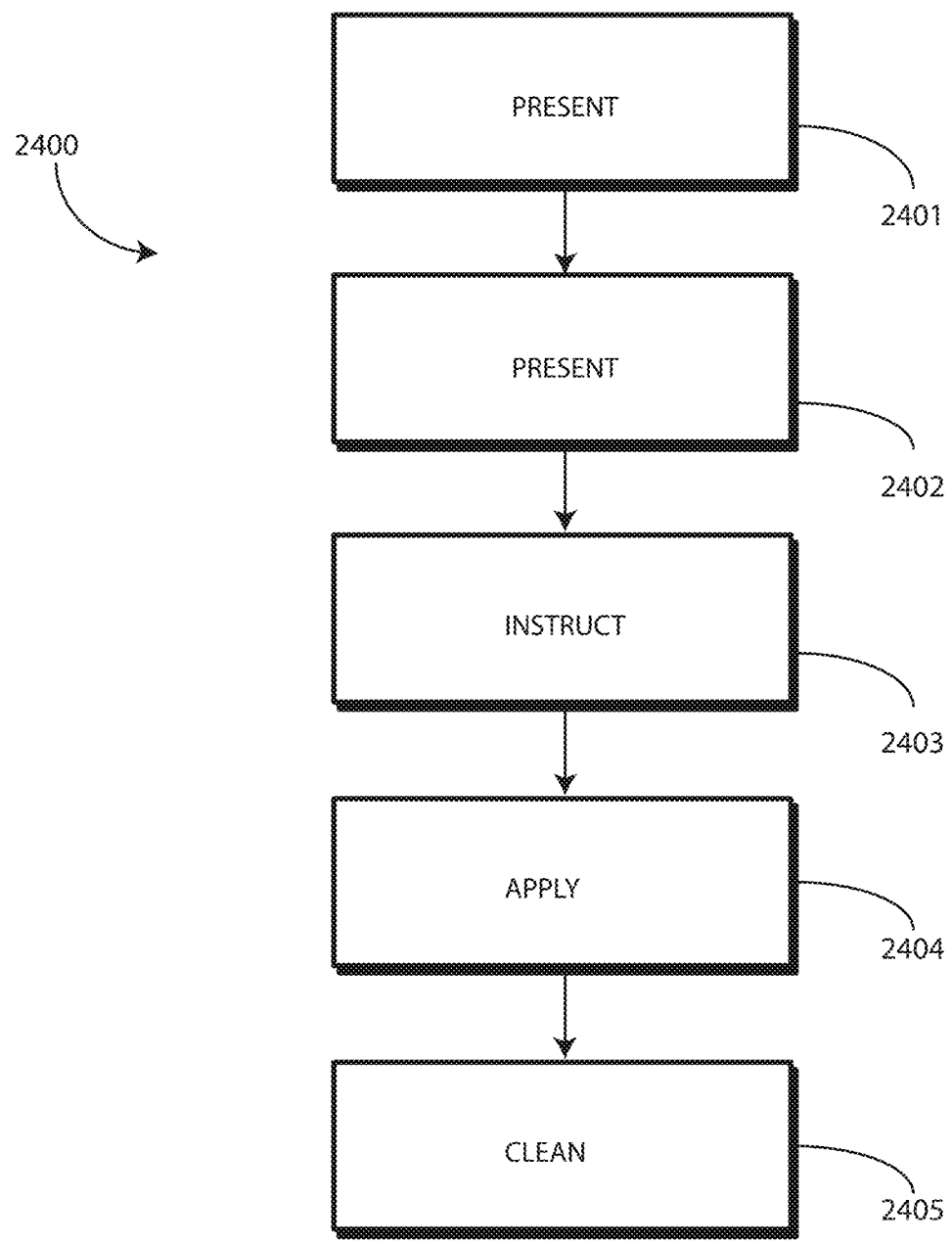
FIG. 24 illustrates another explanatory method in accordance with one or more embodiments of the disclosure.

Turning now to FIG. 24, illustrated therein is one explanatory method 2400 of using a visual teaching aid, cleaning package assembly, or combinations thereof in accordance with one or more embodiments of the disclosure. In one embodiment the method 2400 is for teaching a cleaning order of a predefined area, such as a hospital room.

At step 2401, the method 2400 includes presenting a plurality of portions of the predefined area on a teaching aid such that each portion is pictorially illustrated to be visually perceptible to a viewer with one of a plurality of visual indicators comprising a circle, square, or other shape with a number superimposed on the circle, square, or other shape corresponding to the each portion. At step 2402, the method 2400 can include presenting, on the teaching aid, a legend defining a the plurality of portions in a predefined order with the each portion depicted with one of a plurality of sequential numerical indicia defining the cleaning order for the predefined area.

At step 2403, the method 2400 can optionally include instructing the use of one or more cleaning cloths or microfiber booklets to clean the predefined area by identifying the one of the plurality of sequential numerical indicia disposed on the one or more cleaning cloths or sheets of the microfiber booklet. At optional step 2404, the method 2400 can include applying one or more markers to one or more objects in the predefined area, where those objects correspond to the portions of the legend on a one-to-one basis. At step 2405, the method 2400 comprises cleaning the predefined area in the predefined order.

A portion of the disclosure of this patent document contains material to which a claim for copyright is made. The copyright owner has no objection to the facsimile reproduction by anyone of the patent document or the patent disclosure as it appears in the Patent and Trademark Office patent file or records, but reserves all other copyrights whatsoever.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An apparatus, comprising:
   a plurality of microfiber sheets joined together at a spine to define a microfiber booklet, with each microfiber sheet of the microfiber booklet comprising a badge comprising an alphanumeric indicator selected from a plurality of sequential alphanumeric indicators and identifying an order of which to use the plurality of microfiber sheets and a graphical illustration of one or more objects to be cleaned with the each microfiber sheet; and
   a plurality of markers, each marker of the plurality of markers comprising one of the plurality of sequential alphanumeric indicators.

2. The apparatus of claim 1, wherein the microfiber booklet comprises exactly four microfiber sheets, the exactly four microfiber sheets comprising a first microfiber sheet, a second microfiber sheet, a third microfiber sheet, and a fourth microfiber sheet.

3. The apparatus of claim 2, wherein a first major face of the first microfiber sheet comprises a first badge comprising the alphanumeric indicator "1" and the graphical illustration depicting an operating room light.

4. The apparatus of claim 3, wherein a second major face of the first microfiber sheet comprises a second badge comprising the alphanumeric indicator "2" and the graphical illustration depicting another light and a monitor.

5. The apparatus of claim 4, wherein a first major face of the second microfiber sheet comprises a third badge comprising the alphanumeric indicator "3" and the graphical illustration depicting arms of a table, a bed, and body straps.

6. The apparatus of claim 5, wherein a second major face of the second microfiber sheet comprises a fourth badge comprising the alphanumeric indicator "4A" and the graphical illustration depicting a mattress.

7. The apparatus of claim 6, wherein a first major face of the third microfiber sheet comprises a fifth badge comprising the alphanumeric indicator "4B" and the graphical illustration depicting the mattress.

8. The apparatus of claim 7, wherein a second major face of the third microfiber sheet comprises a sixth badge comprising the alphanumeric indicator "5A" and the graphical illustration depicting an operating table.

9. The apparatus of claim 8, wherein a first major face of the fourth microfiber sheet comprises a seventh badge comprising the alphanumeric indicator "5B" and the graphical illustration depicting the operating table.

10. The apparatus of claim 9, wherein the second major face of the fourth microfiber sheet is devoid of a badge.

11. An apparatus comprising a plurality of microfiber sheets joined together at a spine to define a microfiber booklet packaged with a plurality of markers, with each microfiber sheet of the microfiber booklet comprising a badge comprising an alphanumeric indicator identifying an order of which to use the plurality of microfiber sheets to clean at least a portion of a hospital room and a graphical illustration of one or more objects within the hospital room to be cleaned with the each microfiber sheet, and the plurality of markers comprising a plurality of sequential numerical indicia corresponding to alphanumeric indicators of the plurality of microfiber sheets.

12. The apparatus of claim 11, wherein a first microfiber sheet of the microfiber booklet comprises a first badge comprising the alphanumeric indicator "1" and the graphical illustration of a doorknob and a light switch.

13. The apparatus of claim 12, wherein the first microfiber sheet of the microfiber booklet further comprises a second badge comprising the alphanumeric indicator "2" and the graphical illustration of a restroom sink.

14. The apparatus of claim 13, wherein a second microfiber sheet of the microfiber booklet comprises a third badge comprising the alphanumeric indicator "3" and the graphical illustration of handrails.

15. The apparatus of claim 14, wherein the second microfiber sheet of the microfiber booklet further comprises a fourth badge comprising the alphanumeric indicator "4" and the graphical illustration of the handrails.

16. The apparatus of claim 15, wherein a third microfiber sheet of the microfiber booklet comprises a fifth badge comprising the alphanumeric indicator "5" and the graphical illustration of a bedpan cleaner.

17. The apparatus of claim 16, wherein the third microfiber sheet of the microfiber booklet further comprises a sixth badge comprising the alphanumeric indicator "6" and the graphical illustration of a toilet flush handle.

18. The apparatus of claim 17, wherein a fourth microfiber sheet of the microfiber booklet comprises a seventh badge comprising the alphanumeric indicator "7" and the graphical illustration of a toilet seat.

19. The apparatus of claim 18, wherein the microfiber booklet is color-coded and the fourth microfiber sheet of the microfiber booklet is devoid of any badges.

20. An apparatus, comprising:
    one or more microfiber sheets joined together at a spine to define a microfiber booklet, with each microfiber sheet of the microfiber booklet comprising a badge comprising an alphanumeric indicator identifying an order of which to use the one or more microfiber sheets to clean at least an anesthesia portion of an operating room and a graphical illustration of one or more objects within the anesthesia portion of the operating room to be cleaned with the each microfiber sheet; and an instructional insert, packaged with the microfiber booklet and instructing the order of which to use the one or more microfiber sheets to clean the at least an anesthesia portion of the operating room; and one or more markers comprising a plurality of sequential numerical indicia corresponding to alphanumeric indicators of the one or more microfiber sheets.

* * * * *